US012758441B2

(12) United States Patent
Cann et al.

(10) Patent No.: US 12,758,441 B2
(45) Date of Patent: Oct. 13, 2026

(54) ALL-TERRAIN ELECTRIC WHEELCHAIR AND CORRESPONDING ASSEMBLY

(71) Applicant: Asian Prime Sources Limited, Hong Kong (CN)

(72) Inventors: Michael John Cann, Auckland (NZ); Anthony Kevin Stent, Auckland (NZ); Jonathan Andrew George Lambert, Auckland (NZ)

(73) Assignee: Asian Prime Sources Limited, Hong Kong (CN)

( * ) Notice: Subject to any disclaimer, the term of this patent is extended or adjusted under 35 U.S.C. 154(b) by 498 days.

(21) Appl. No.: 18/461,783

(22) Filed: Sep. 6, 2023

(65) Prior Publication Data

US 2024/0082082 A1 Mar. 14, 2024

Related U.S. Application Data

(60) Provisional application No. 63/404,558, filed on Sep. 8, 2022.

(51) Int. Cl.
*A61G 5/04* (2013.01)
*A61G 5/08* (2006.01)
*A61G 5/10* (2006.01)

(52) U.S. Cl.
CPC ............. *A61G 5/047* (2013.01); *A61G 5/041* (2013.01); *A61G 5/0875* (2016.11); *A61G 5/10* (2013.01); *A61G 5/1083* (2016.11); *A61G 5/1089* (2016.11)

(58) Field of Classification Search
CPC ....... A61G 5/0875; A61G 5/041; A61G 5/047
See application file for complete search history.

(56) References Cited

U.S. PATENT DOCUMENTS 3,749,192 A * 7/1973 Karchak, Jr. ........ A61G 5/0875 297/411.27
5,156,226 A * 10/1992 Boyer .................. A61G 5/0891 180/907

(Continued)

FOREIGN PATENT DOCUMENTS

EP 1 523 970 A1 4/2005
EP 3 351 228 B1 9/2019

OTHER PUBLICATIONS

Oct. 11, 2023 Search Report issued in European Application No. 23 19 5758.

*Primary Examiner* — Minnah L Seoh
*Assistant Examiner* — Hosam Shabara
(74) *Attorney, Agent, or Firm* — Nelson Mullins Riley & Scarborough LLP

(57) ABSTRACT

A wheelchair assembly is provided for easy assembly, disassembly, and transport. The wheelchair assembly includes a plurality of subassemblies, including a first subassembly having a first frame and a second subassembly having a second frame. The wheelchair assembly includes at least one motor and a plurality of wheels. The plurality of subassemblies are configured to be selectively attached with each other to form the wheelchair assembly, and the wheelchair assembly is configured to be easily assembled and disassembled. The subassemblies are configured to be disassembled from each other so that each of the plurality of subassemblies can be separately carried by a single person. The wheelchair assembly is an all-terrain wheelchair assembly.

20 Claims, 21 Drawing Sheets

(56) References Cited

U.S. PATENT DOCUMENTS

| | | | | |
|---|---|---|---|---|
| 7,556,109 | B2 * | 7/2009 | Chen | A61G 5/1078 180/908 |
| 7,971,893 | B1 | 7/2011 | Dunn | |
| 8,727,048 | B2 * | 5/2014 | Jurkiewicz | A61G 5/0875 280/281.1 |
| 10,772,774 | B2 | 9/2020 | Richter | |
| 10,945,900 | B1 * | 3/2021 | Ousborne | A61G 5/1005 |
| 2004/0084230 | A1 * | 5/2004 | Grymko | B60K 1/04 180/65.1 |
| 2012/0279789 | A1 * | 11/2012 | Brill | A61G 5/047 180/6.5 |
| 2014/0035253 | A1 * | 2/2014 | Helterbrand | A61G 5/1083 280/250.1 |
| 2015/0053490 | A1 * | 2/2015 | Santagata | A61G 5/045 180/65.1 |
| 2015/0224002 | A1 * | 8/2015 | Hutchins | A61G 5/08 280/30 |
| 2018/0280213 | A1 * | 10/2018 | Hancock | A61G 5/047 |
| 2020/0237586 | A1 * | 7/2020 | Choi | A61G 5/1091 |
| 2022/0000688 | A1 | 1/2022 | Klein | |

* cited by examiner

230B

ALL-TERRAIN ELECTRIC WHEELCHAIR AND CORRESPONDING ASSEMBLY

CROSS-REFERENCE TO RELATED APPLICATION(S)

This application claims priority to U.S. Provisional Application No. 63/404,558, entitled "All-Terrain Electric Wheelchair and Corresponding Assembly", filed Sep. 8, 2022, the contents of which are hereby incorporated by reference in its entirety.

FIELD OF THE INVENTION

Embodiments of the present invention relate generally to an improved wheelchair and, more particularly, an all-terrain electric wheelchair that is easy to assemble, disassemble, store, and transport.

BACKGROUND OF THE INVENTION

All-terrain wheelchairs are used to help people with mobility issues traverse across all-types of terrain. Notably, beaches are particularly difficult to traverse due to, for example, soft sand, dunes, rocky terrain, etc. Beach wheelchairs are most often manually propelled, although there are some electrically powered beach wheelchairs. However, these electrically powered beach wheelchairs are often very large, heavy, expensive, and difficult to transport. These issues discourage or prevent many individuals from being able to regularly use electrically powered beach wheelchairs. These issues also tend to discourage individuals from purchasing their own electrically powered beach wheelchairs.

BRIEF SUMMARY OF THE INVENTION

Various embodiments described herein enable users to disassemble the wheelchair assembly to smaller components that are easier to carry, store, and transport. Some of the heaviest components in the wheelchair assembly may be electrical components such as the battery and the components associated with the motor. These components often possess an increased weight, which may be problematic or less desirable for all-terrain wheelchair assemblies that may require greater power to operate over different types of terrain. Various embodiments account for this by providing motor components on a separate motor subassembly that can be selectively attached or disengaged from the remainder of the wheelchair assembly, and the battery may be provided separately and mountable to a seat subassembly that is separate from the motor subassembly. By providing the battery in a separate subassembly from the motor subassembly, the overall weight of the motor subassembly may be greatly reduced and the overall weight of the seat subassembly (including the battery) may still be relatively light. In some embodiments, the battery may be further separated from the seat subassembly to further reduce weight of each carriable part (e.g., each subassembly). Thus, in some embodiments, the motor subassembly and the seat subassembly may both be easily carriable by a single person when carried separately. Furthermore, by providing the battery away from the motor components, the weight distribution of the wheelchair assembly as a whole may be improved.

By allowing for the wheelchair assembly to be broken down into various subassemblies, the subassemblies may be permitted to fit into smaller storage areas. For example, by breaking down the wheelchair assembly, the various subassemblies may be more easily stored in a trunk of a car or sports utility vehicle (SUV) (e.g., less than 70 cubic feet, less than 50 cubic feet, less than 40 cubic feet, less than 30 cubic feet, and preferably less than 20 cubic feet). This may enable a larger number of individuals to use their own wheelchair assembly. In some embodiments, the wheelchair assembly may be assembled, disassembled, and stored without the requirement of vans, trailers, specialist lifts, or ramps, increasing its ease of use.

The motor subassembly may also be selectively added or removed from the seat subassembly, and this may give the user an option to remove the motor subassembly so that the seat subassembly is used by manually moving the seat subassembly. The motor subassembly may be designed in a manner that is easily retrofittable to existing wheelchairs or seat subassemblies.

In an example embodiment, a wheelchair assembly for easy assembly and disassembly is provided. The wheelchair assembly includes a plurality of frames, at least one motor, a battery, and a plurality of wheels. The frames are configured to be selectively attached or disassembled with each other to form the wheelchair assembly. The wheelchair assembly is configured to be easily assembled and disassembled. Further, the wheelchair assembly is an all-terrain wheelchair assembly.

In some embodiments, the wheelchair assembly may include a plurality of subassemblies, and each of the subassemblies may weigh less than thirty-five (35) kilograms. Further, in some embodiments, the subassemblies may include a first subassembly and a second subassembly, and the plurality of frames may include a first frame and a second frame. The first subassembly may include the first frame and the battery, and the second subassembly may include the second frame and the motor(s). The first subassembly may be configured to be selectively attached to the second subassembly. Additionally, in some embodiments, the battery may be provided in a different subassembly than the motor(s) to more evenly distribute the weight of the wheelchair assembly and so that the weight of the first subassembly and the second subassembly are both less than thirty-five (35) kilograms. In some embodiments, the battery and the motor(s) may be separated by a horizontal distance of at least two hundred five (205) millimeters when the wheelchair assembly is fully assembled and oriented in an upright position.

In some embodiments, the wheelchair assembly may also include an additional set of one or more wheels that are provided at the rear of the wheelchair assembly. The additional set of wheel(s) may be configured to prevent the wheelchair assembly from toppling backward. Furthermore, in some embodiments, the additional set of wheel(s) may be configured to prevent the motor(s) from contacting the ground when the motor(s) is assembled.

In some embodiments, the wheelchair assembly may also include an electronic control assembly that is configured to control motion of the wheelchair assembly. Additionally, in some embodiments, the electronic control assembly may be configured to receive user commands, and the electronic control assembly may be configured to adjust the direction or speed of the wheelchair assembly. Furthermore, in some embodiments, the electronic control assembly may include a joystick configured to receive user commands. The wheelchair assembly may also include an occupant armrest, and the joystick may be positioned proximate to the occupant armrest so that the joystick may be configured to be operated by an occupant.

In some embodiments, the wheelchair assembly may define a front-to-back direction, and the wheelchair assembly may define a center of gravity. The motor subassembly and the battery may each define a center of gravity. The center of gravity for the motor subassembly may be provided rearwardly of the center of gravity for the wheelchair assembly along the front-to-back direction. Further, the center of gravity for the battery may be provided in front of the center of gravity for the wheelchair assembly along the front-to-back direction.

In another example embodiment, a wheelchair assembly is provided for easy assembly and disassembly. The wheelchair assembly includes a plurality of subassemblies, including a first subassembly having a first frame and a second subassembly having a second frame. The wheelchair assembly includes at least one motor and a plurality of wheels. Furthermore, the subassemblies are configured to be selectively attached with each other to form the wheelchair assembly, and the wheelchair assembly is configured to be easily assembled and disassembled. The subassemblies are configured to be disassembled from each other so that each of the subassemblies can be separately carried by a single person. The wheelchair assembly is an all-terrain wheelchair assembly.

In some embodiments, the first subassembly may be a seat subassembly, and the second subassembly may be a motor subassembly. The motor(s) may be provided in the motor subassembly, and the motor subassembly may be configured to be selectively attached to the seat subassembly to make the wheelchair assembly electrically-powered. The seat subassembly may be configured to be manually operated when the motor subassembly is not attached to the seat subassembly. In some embodiments, the plurality of subassemblies includes a third subassembly including a battery. Furthermore, in some embodiments, each of the plurality of subassemblies may weigh less than twenty-nine (29) kilograms. Additionally, in some embodiments, the plurality of subassemblies may be configured to be disassembled from each other so that each of the subassemblies may be stored together in a volume of fifty (50) cubic feet or less.

In another example embodiment, a motor subassembly is provided for use in a wheelchair assembly. The motor subassembly includes a motor platform, a motor controller, and at least one motor. The motor platform is configured to receive the motor(s) and the motor controller for mounting thereon. The combined weight of the motor subassembly is less than twenty-nine kilograms. The motor platform is configured to be selectively attached to a remaining portion of a wheelchair assembly to form the wheelchair assembly.

In some embodiments, the motor subassembly may also include a pair of driven hubs and a pair of driven wheels. The pair of driven hubs may be configured to be attached at opposite sides of the motor platform, and the pair of driven wheels may each be configured to be attached to a respective driven hub of the pair of driven hubs. Additionally, in some embodiments, the motor(s) may include a pair of motors, and the pair of motors may each be configured to generate rotation of a respective driven hub of the pair of driven hubs. Furthermore, in some embodiments, the motor subassembly also includes an additional set of one or more wheels that are provided at the rear of the motor subassembly, and the additional set of wheel(s) may be configured to prevent the wheelchair assembly from toppling backward.

BRIEF DESCRIPTION OF THE DRAWINGS

Figure 1:
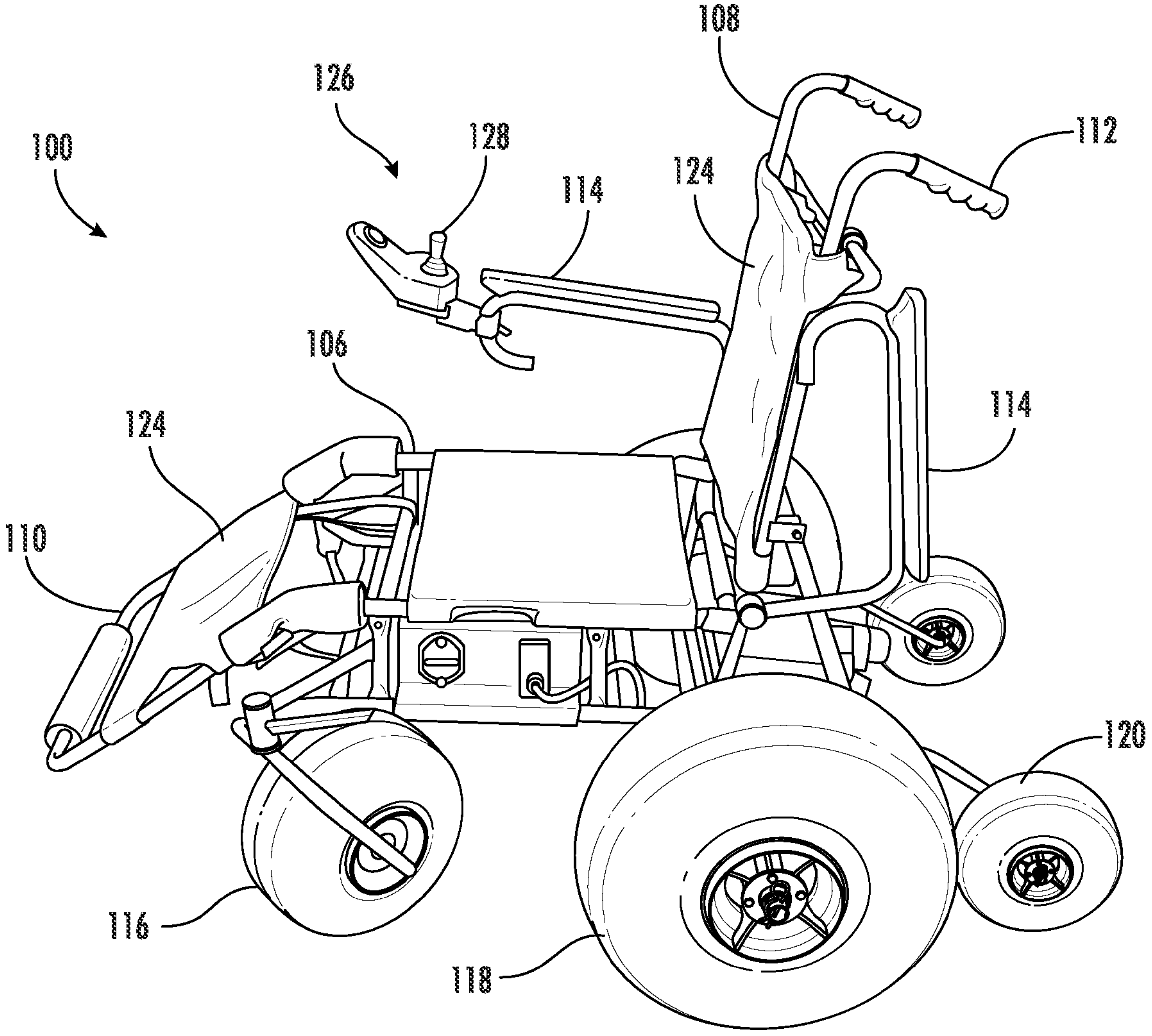
Figure 2A:
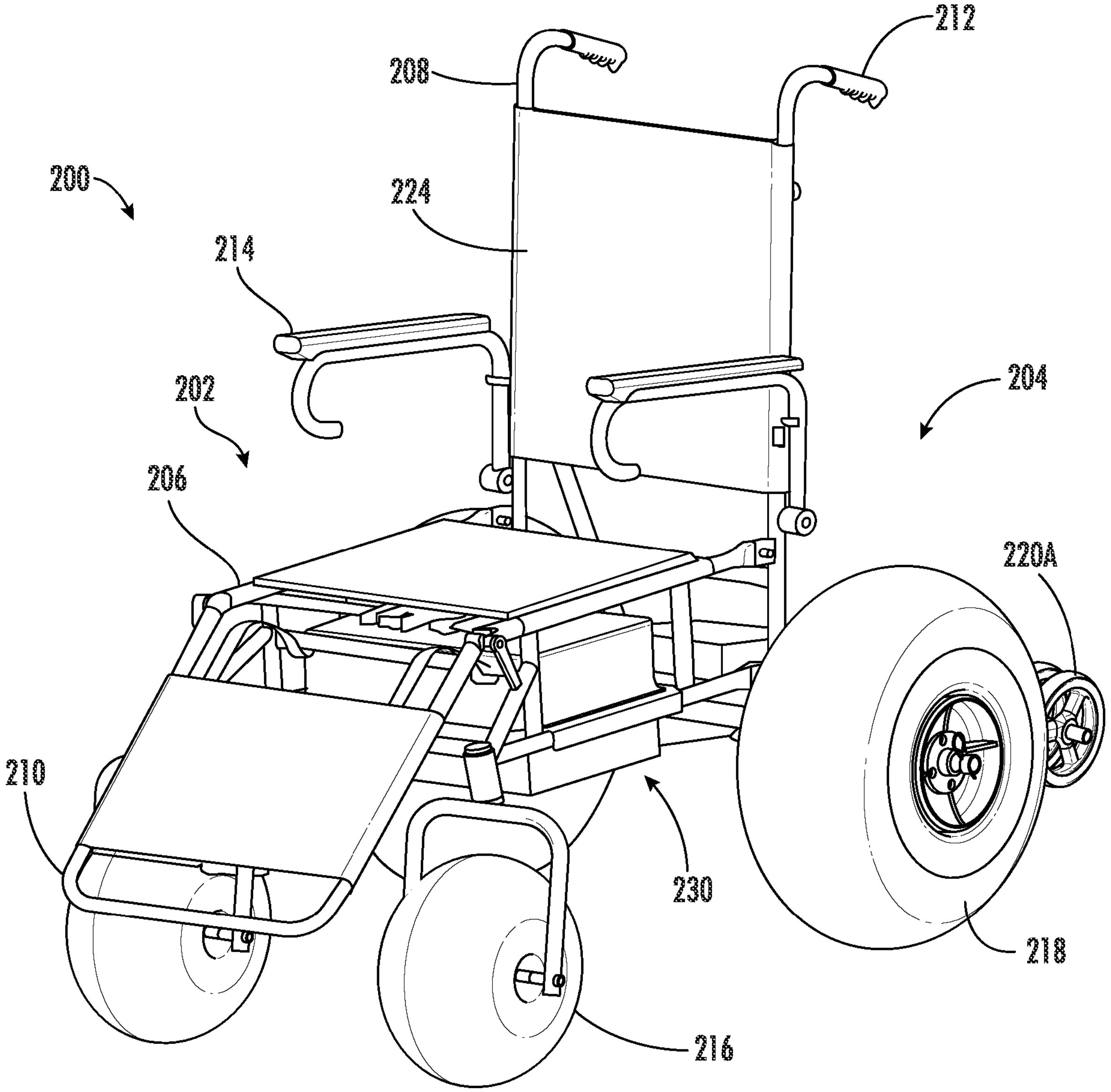
Figure 2B:
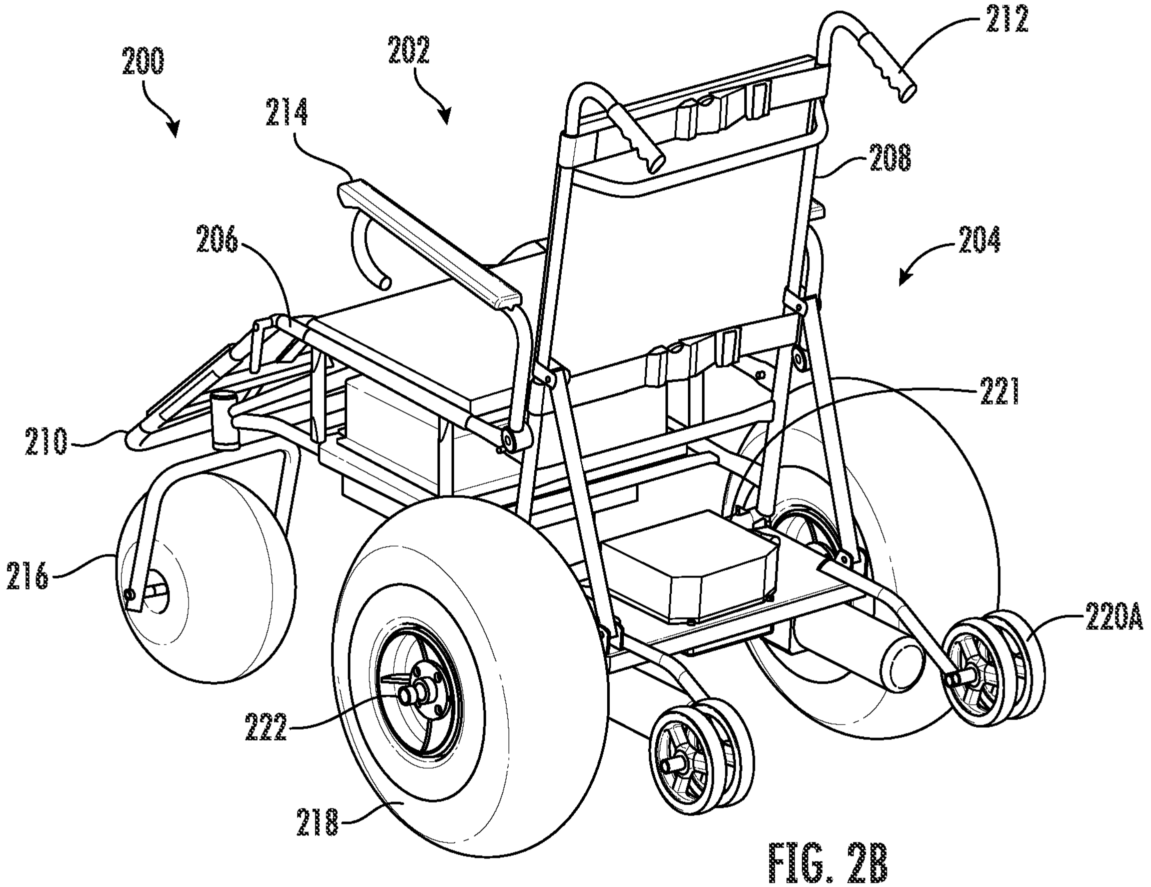
Figure 2C:
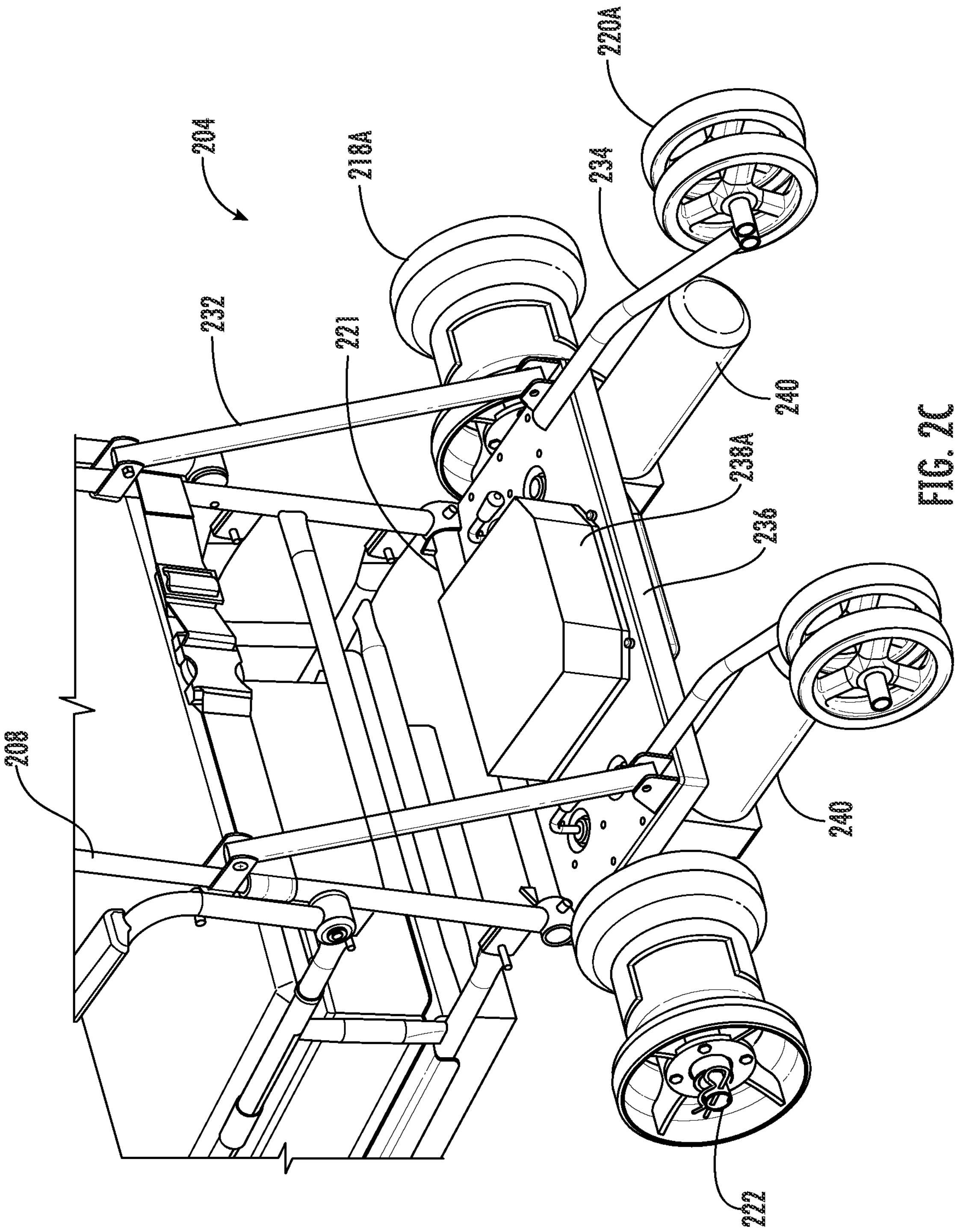
Figure 3A:
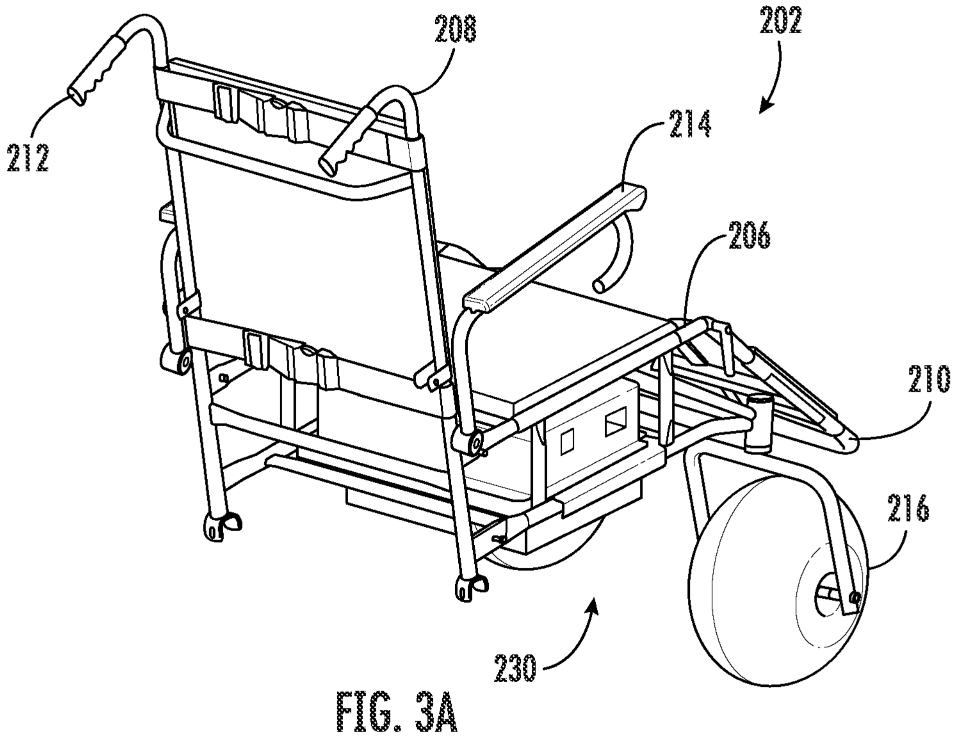
Figure 3B:
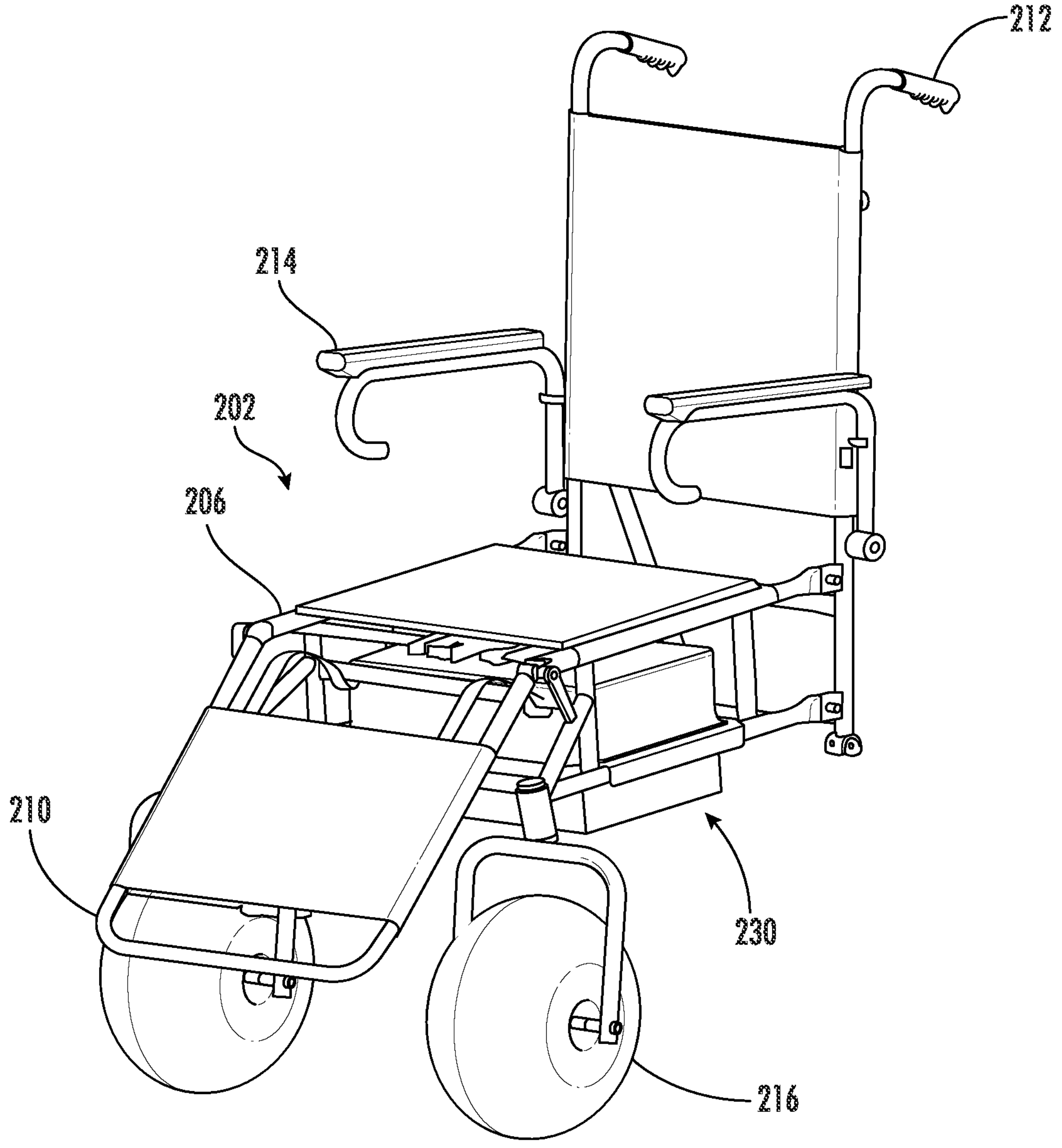
Figure 3C:
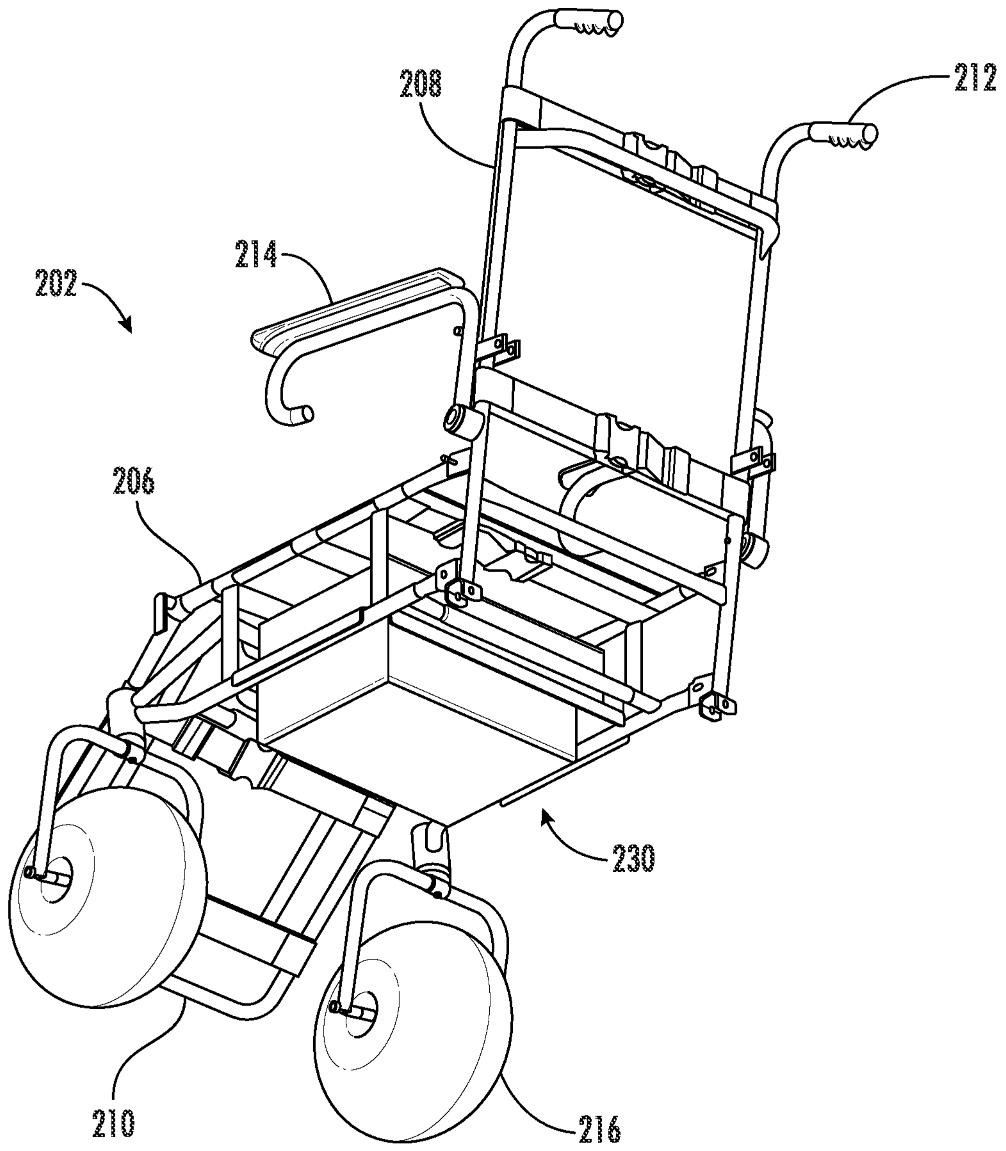
Figure 4A:
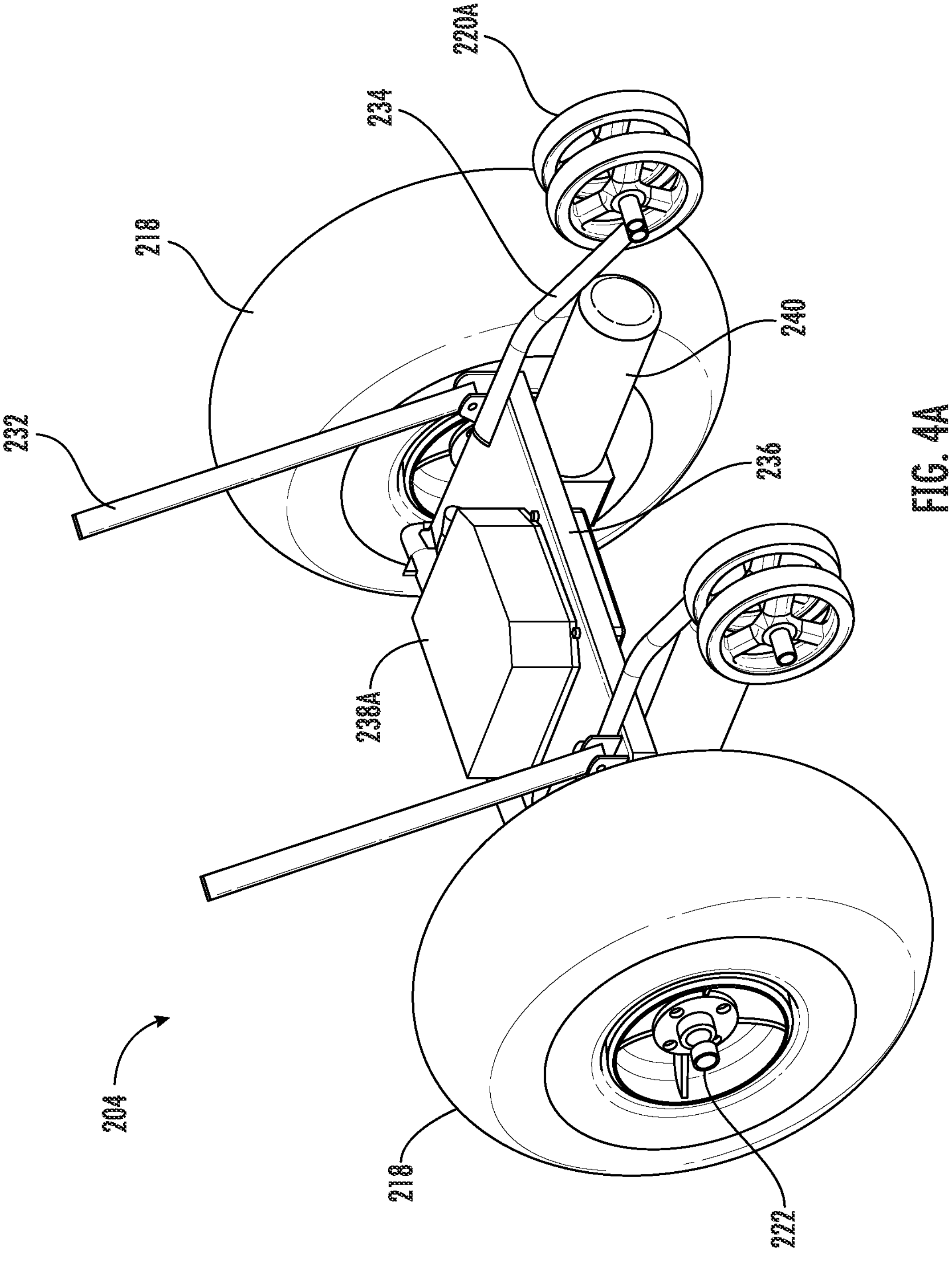
Figure 4B:
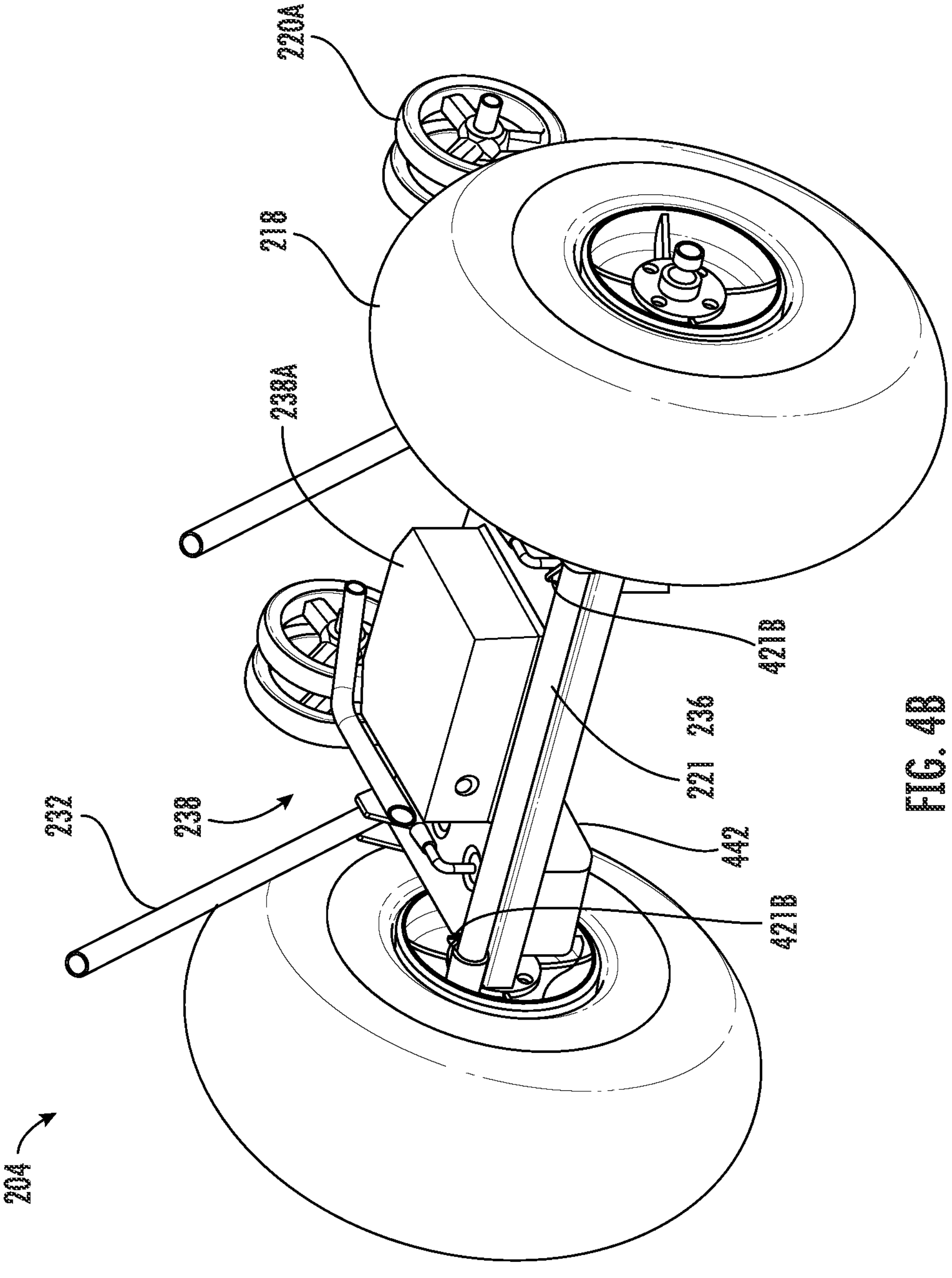
Figure 4C:
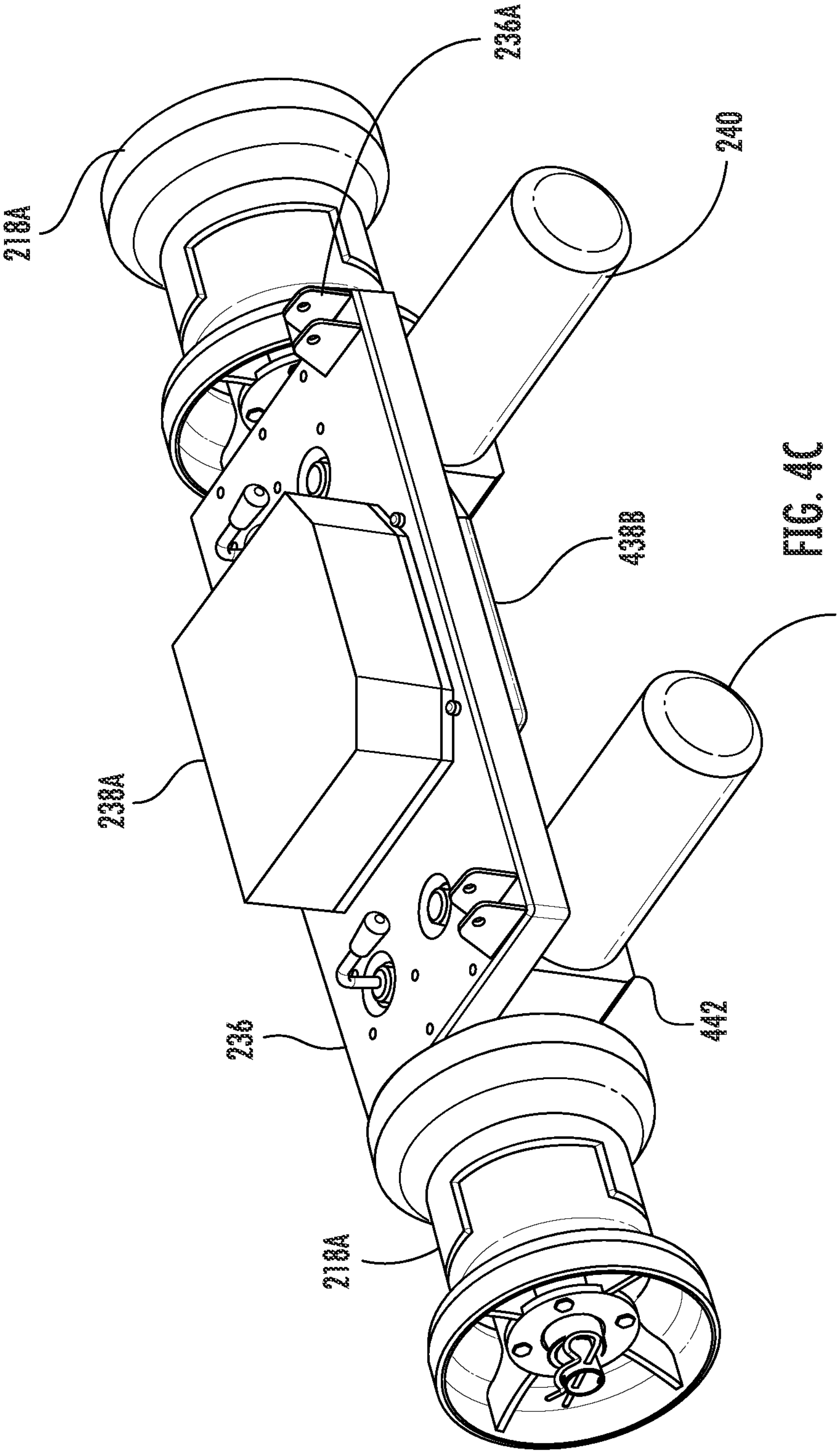
Figure 4D:
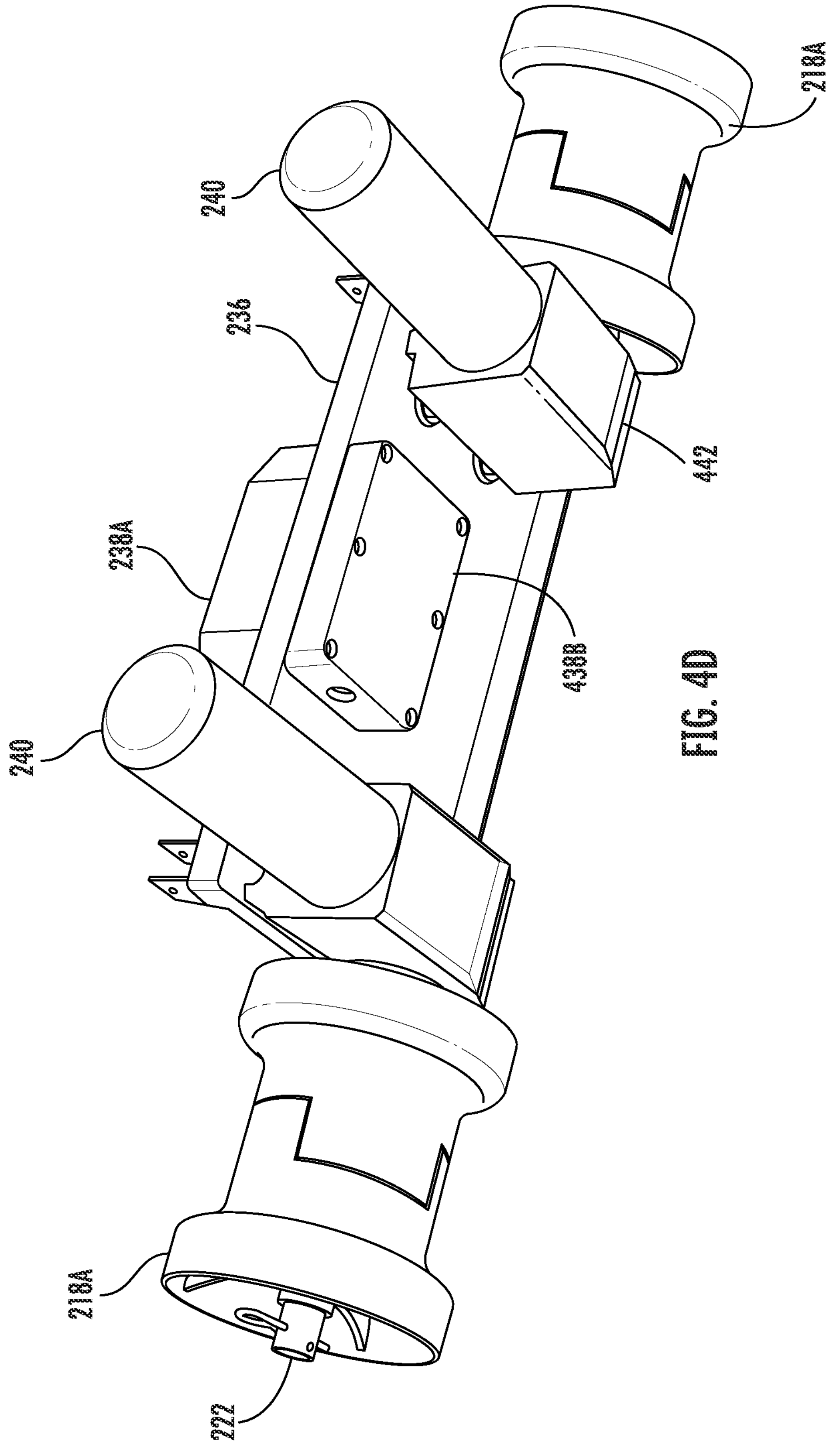
Figure 4E:
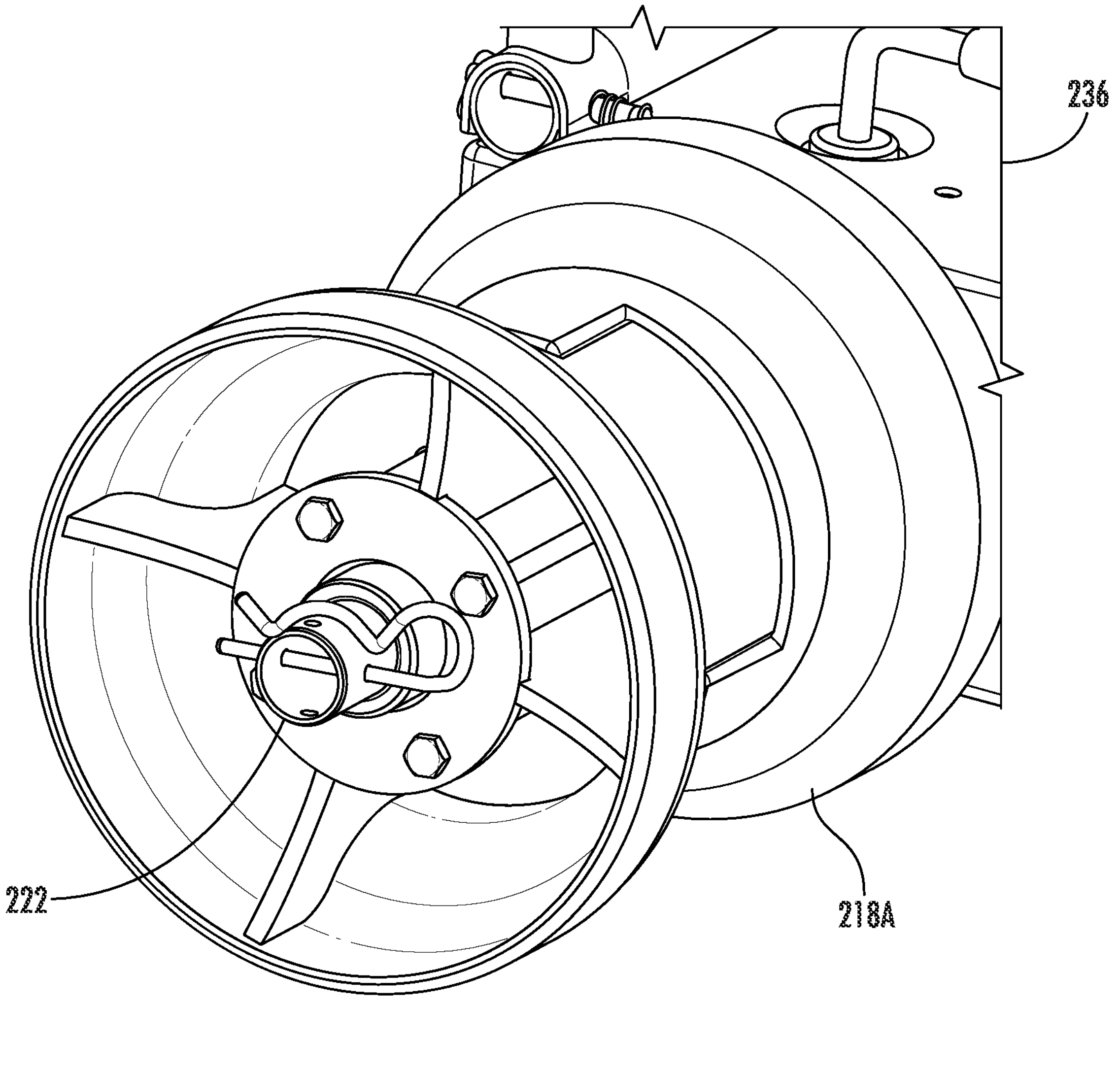
Figure 4F:
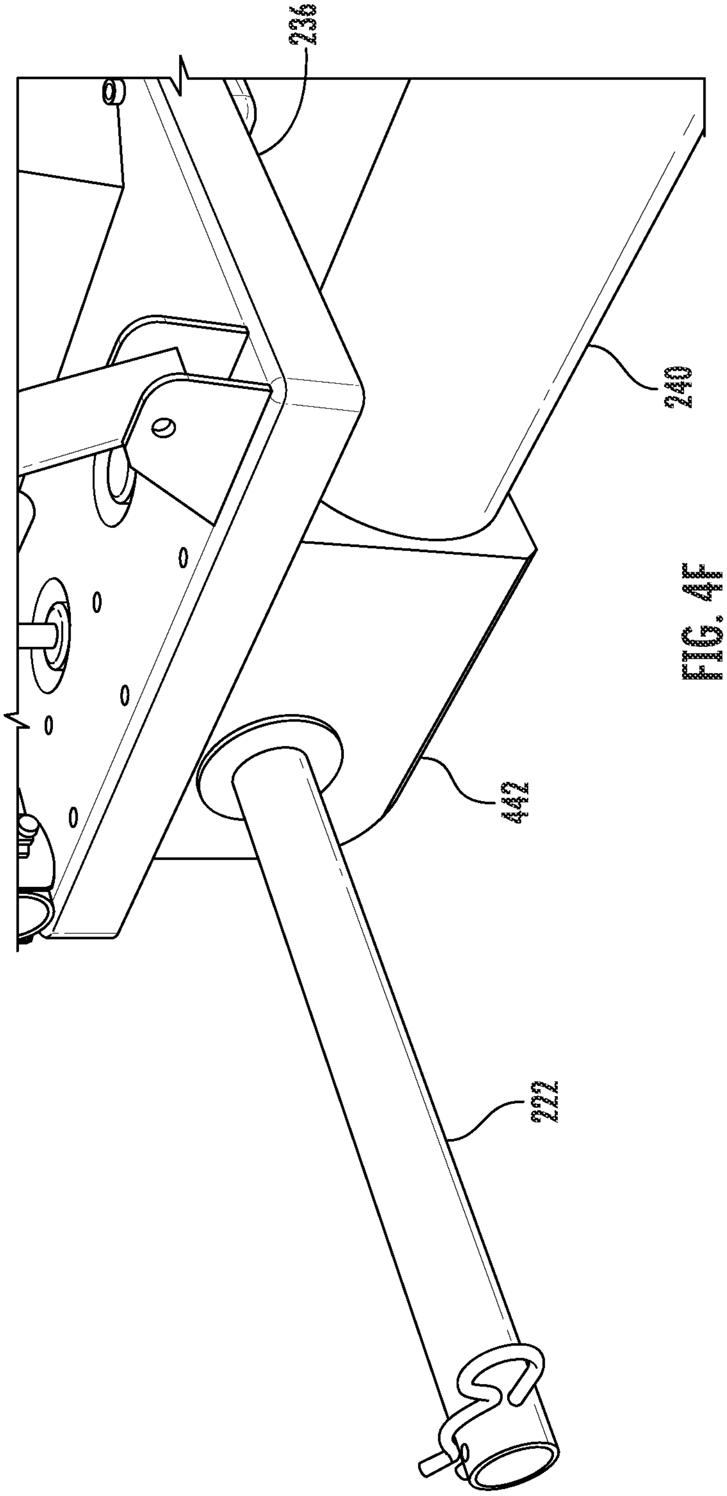
Figure 5A:
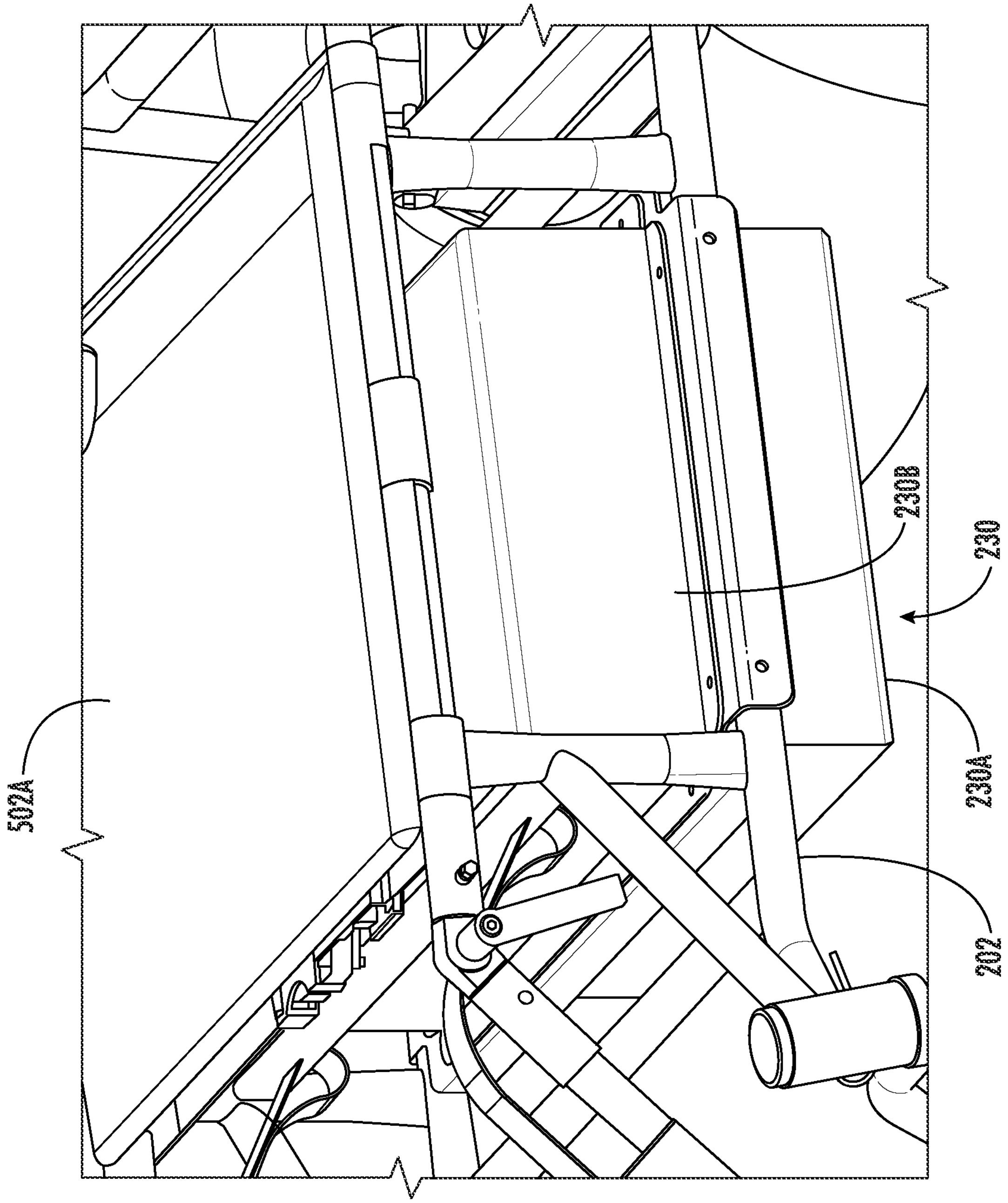
Figure 5B:
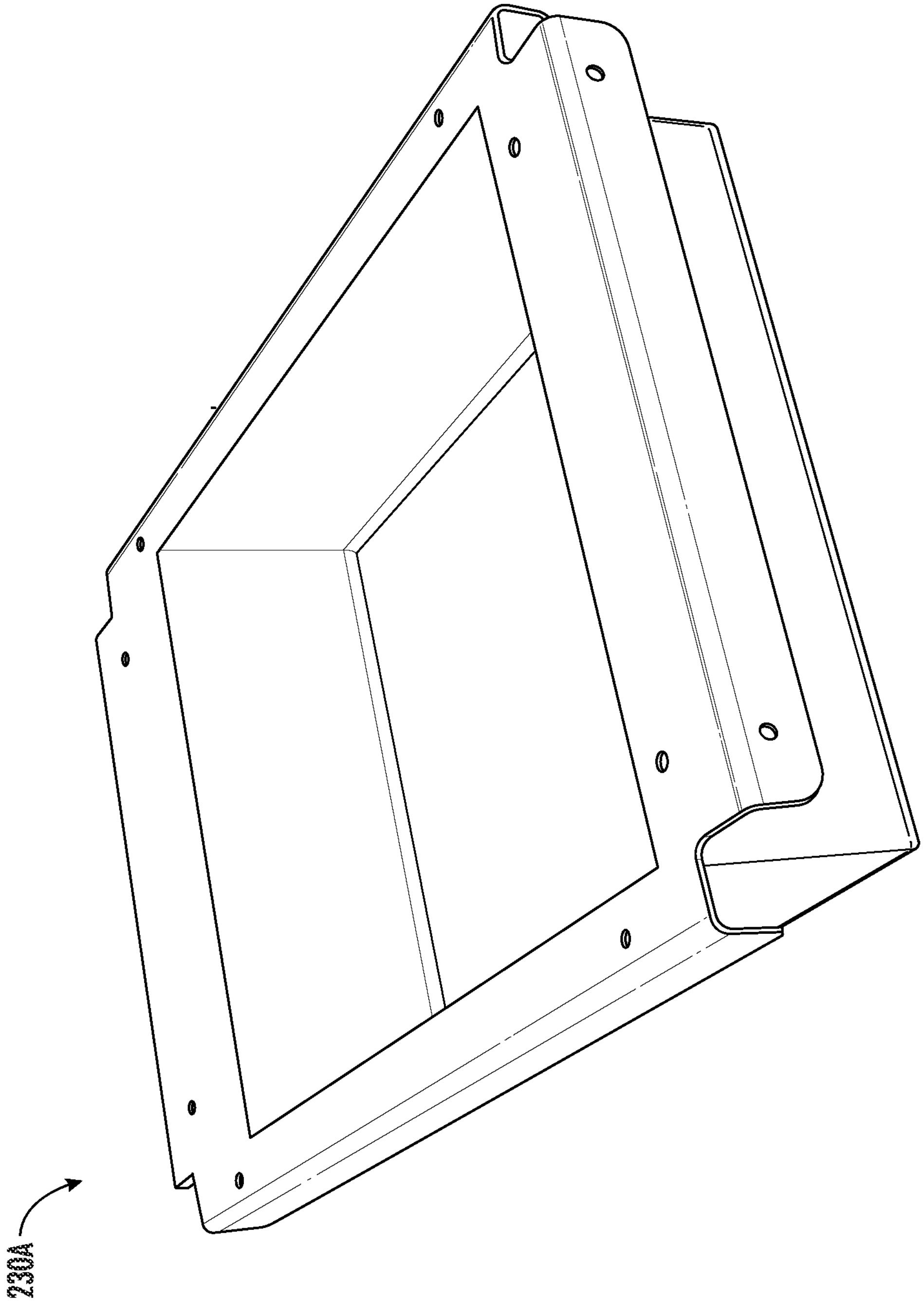
Figure 5C:
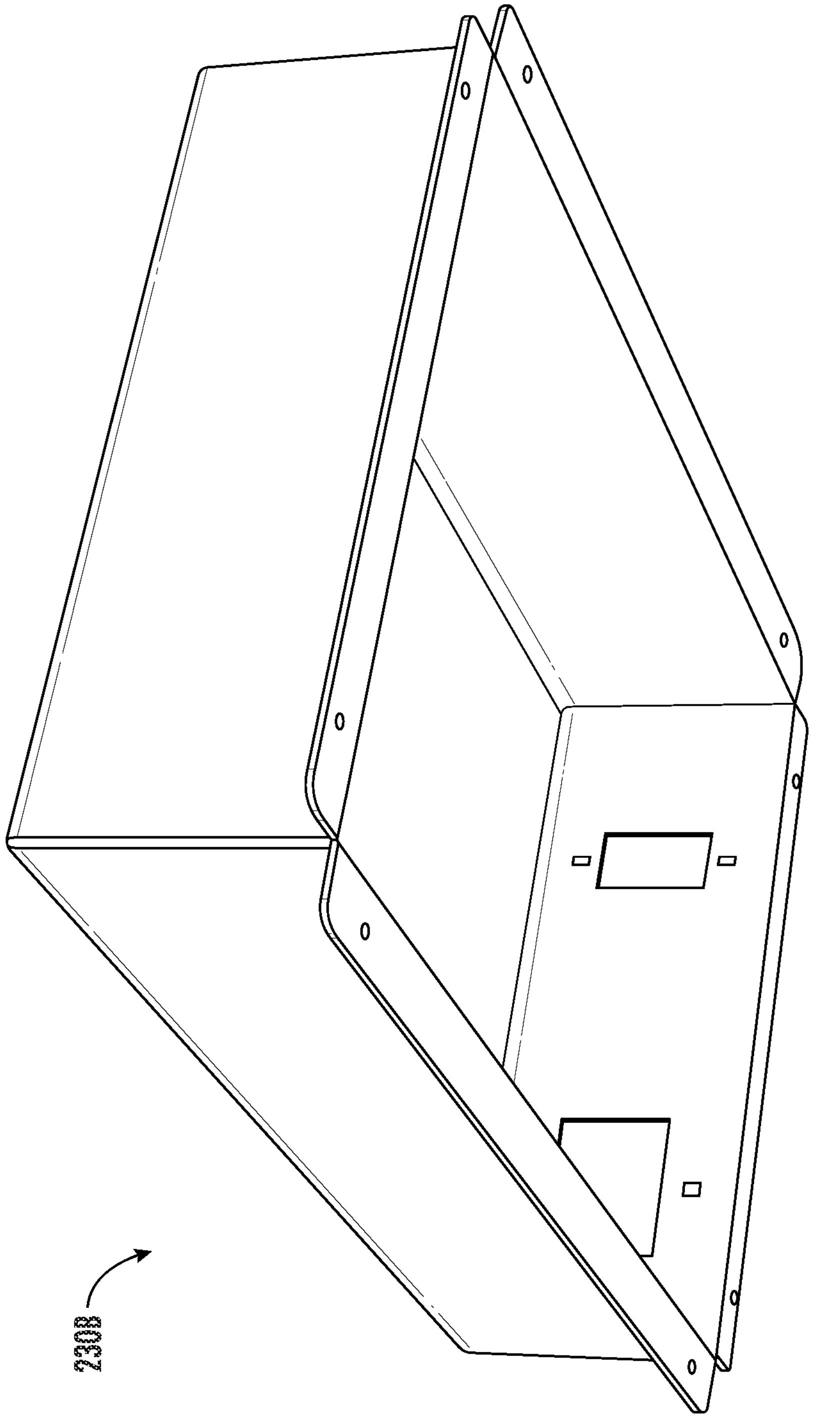
Figure 6A:
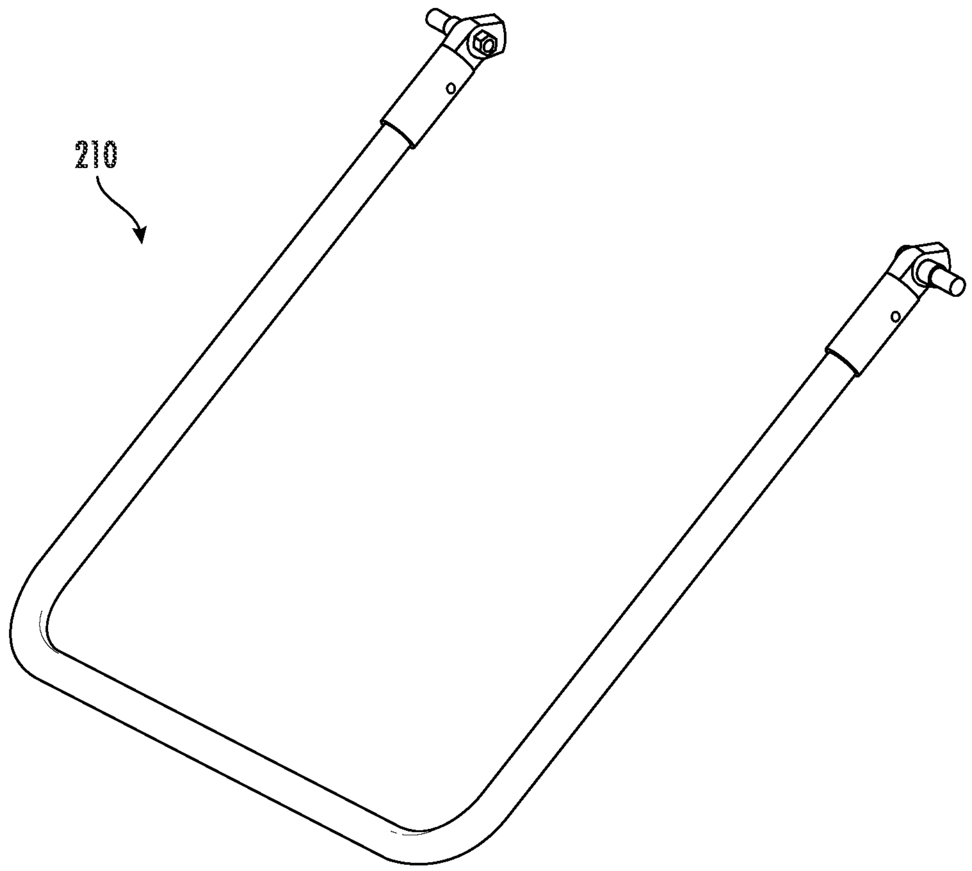
Figure 6B:
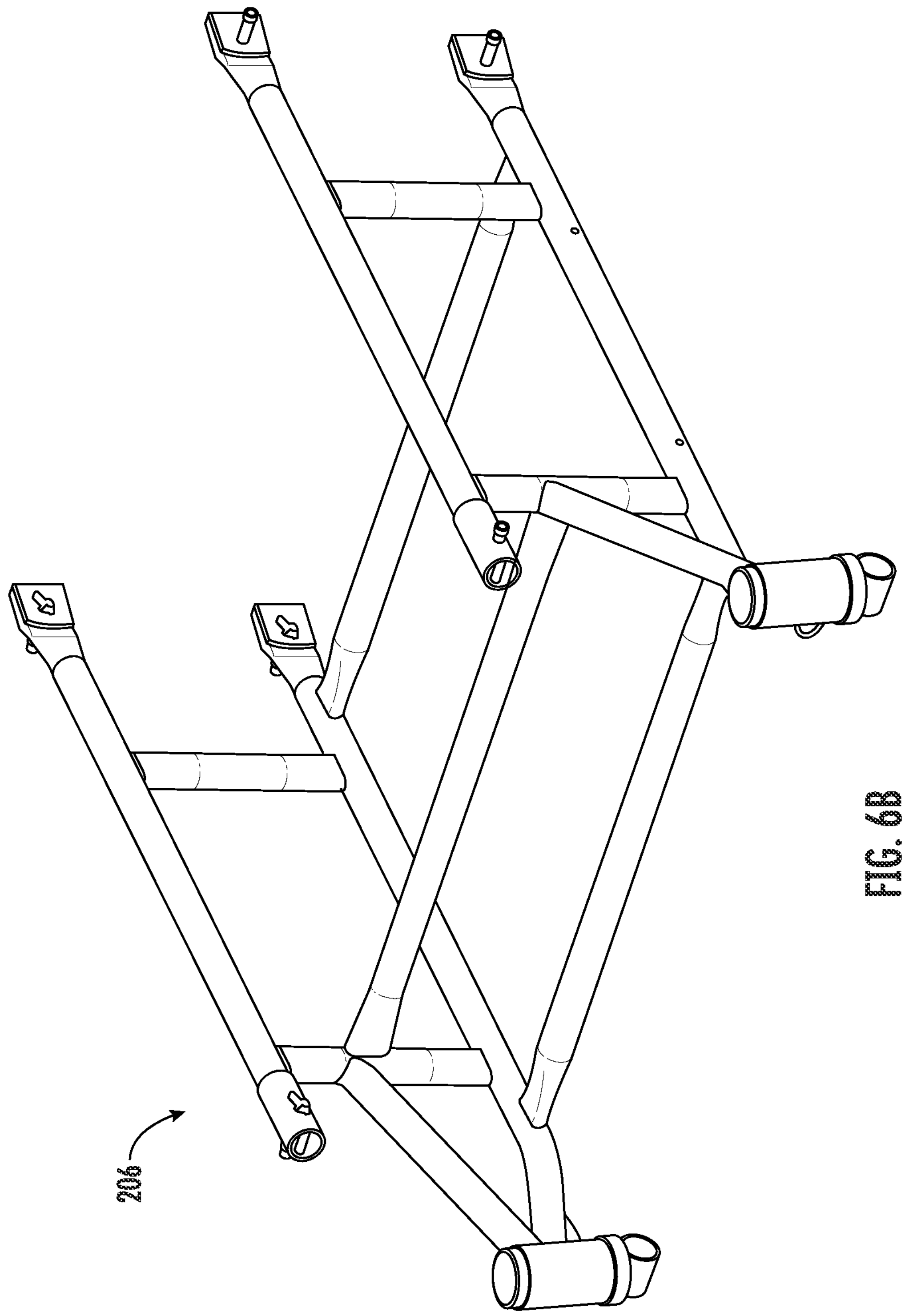
Figure 6C:
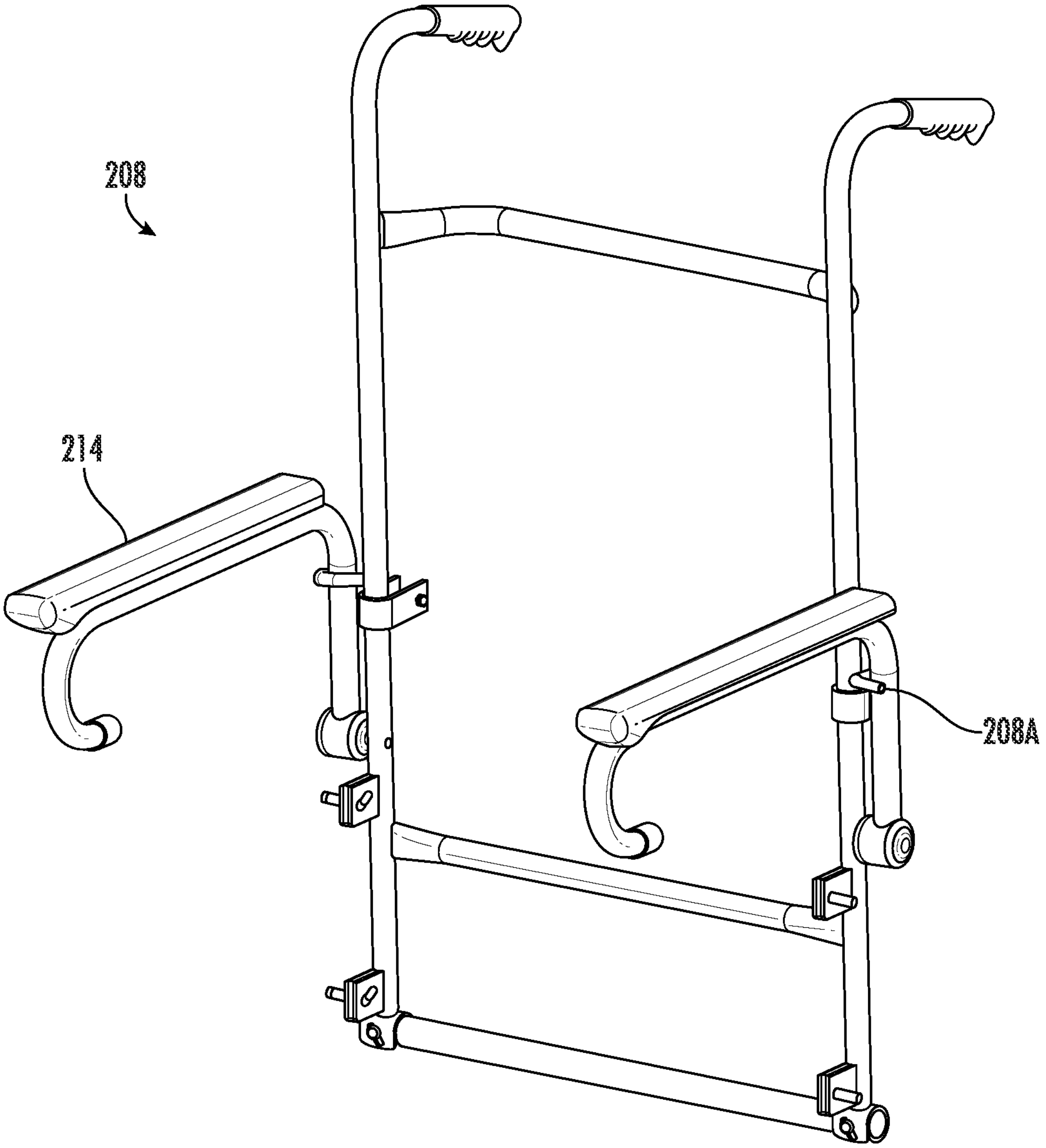
Figure 6D:
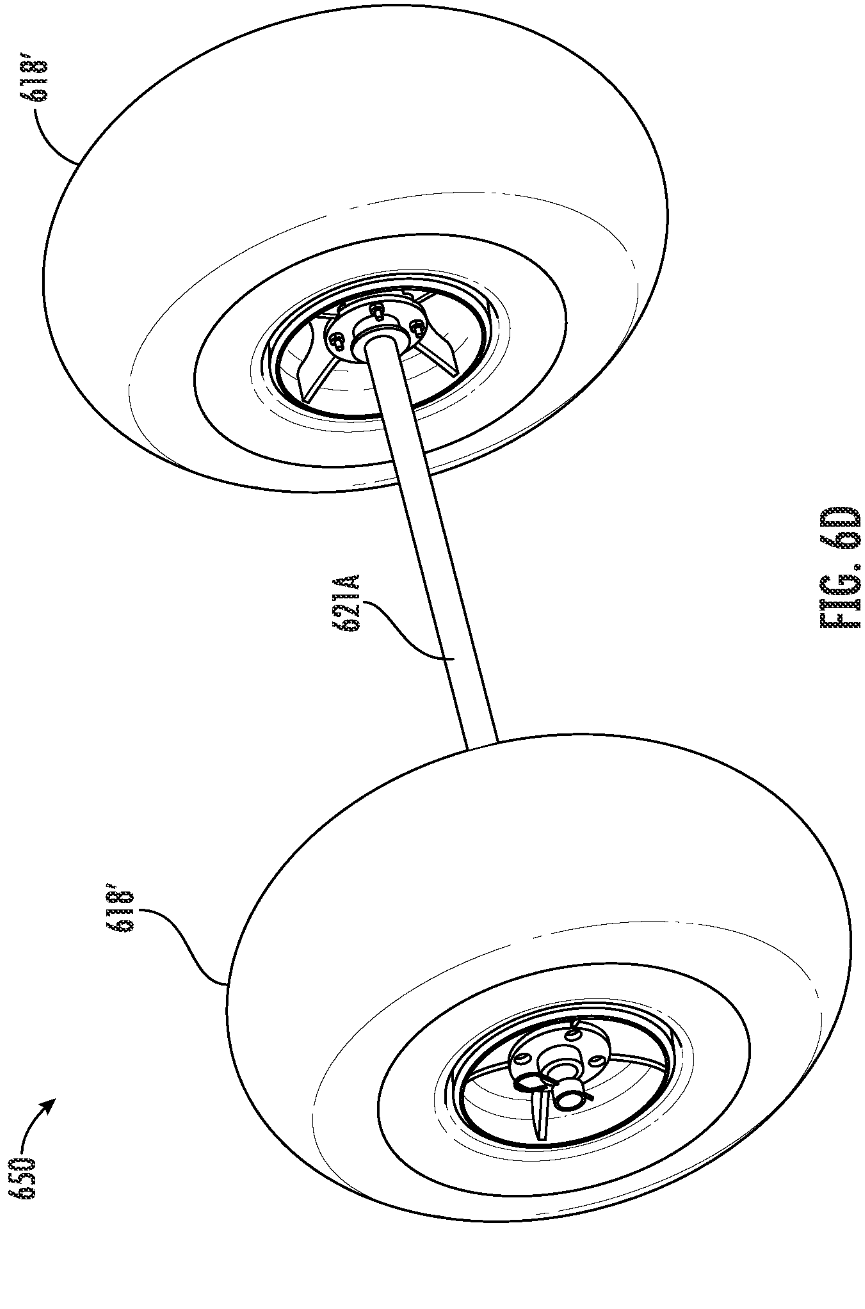
Figure 7:
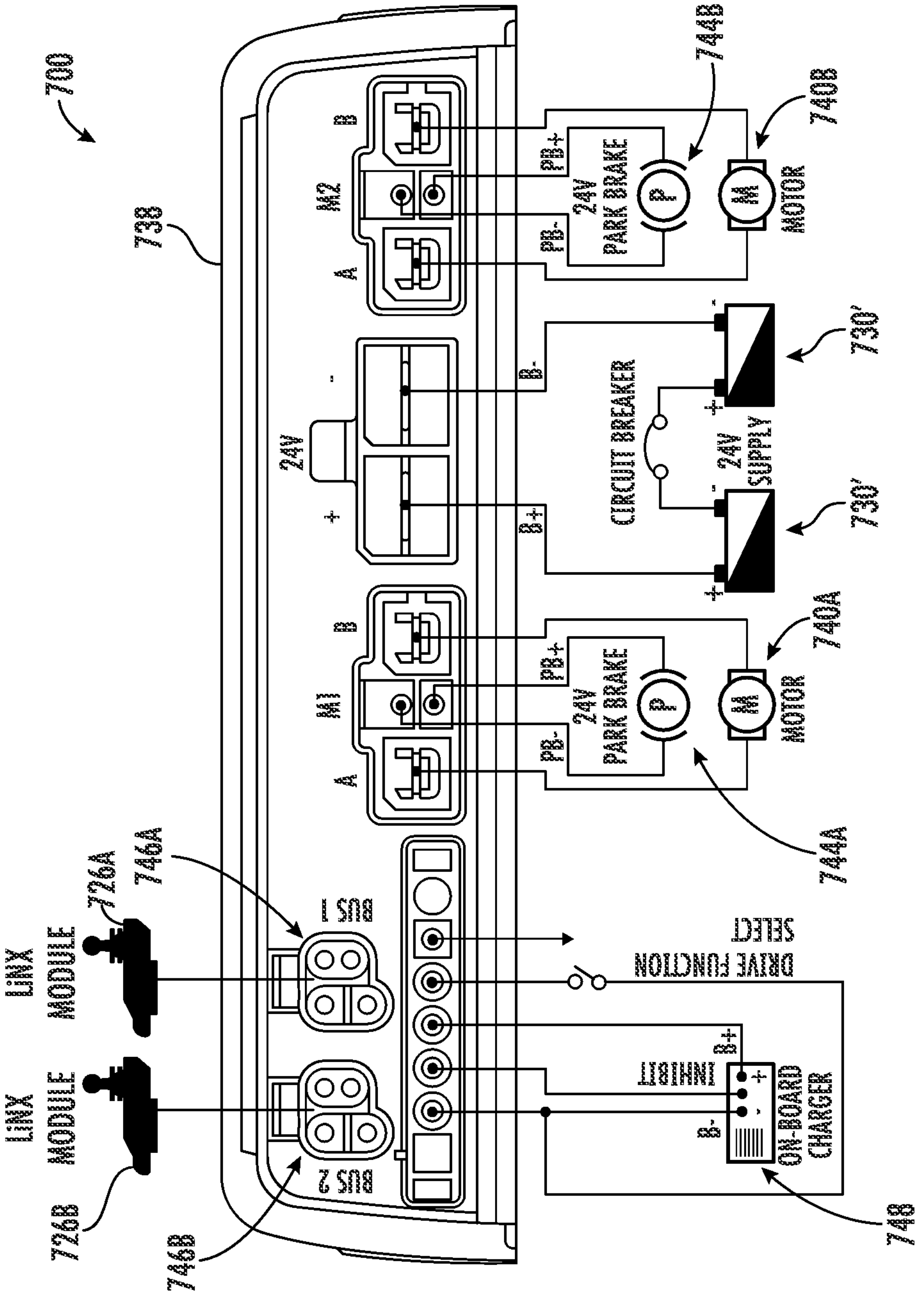

Having thus described the invention in general terms, reference will now be made to the accompanying drawings, which are not necessarily drawn to scale, and wherein:

FIG. 1 illustrates a perspective view of an example wheelchair assembly, in accordance with some embodiments discussed herein;

FIG. 2A-2B illustrate varying perspective views of an example wheelchair assembly, in accordance with some embodiments discussed herein;

FIG. 2C illustrates an enhanced perspective view of the example motor subassembly, in accordance with some embodiments discussed herein;

FIG. 3A-3C illustrate varying perspective views of an example seat subassembly, in accordance with some embodiments discussed herein;

FIG. 4A-4B illustrate varying perspective views of an example motor subassembly, in accordance with some embodiments discussed herein;

FIG. 4C-4D illustrate varying perspective views of certain components in the example motor subassembly of FIG. 4A, in accordance with some embodiments discussed herein;

FIG. 4E illustrates an enhanced perspective view of an example driven wheel hub, in accordance with some embodiments discussed herein;

FIG. 4F illustrates an enhanced perspective view of an example motor and gear box, in accordance with some embodiments discussed herein;

FIG. 5A illustrates a perspective view of an example battery box disposed on the seat subassembly, in accordance with some embodiments discussed herein;

FIG. 5B illustrates a perspective view of an example bottom portion of the battery box of FIG. 5A, in accordance with some embodiments discussed herein;

FIG. 5C illustrates a perspective view of an example top portion of the battery box of FIG. 5A, in accordance with some embodiments discussed herein;

FIG. 6A illustrates a perspective view of an example footrest frame, in accordance with some embodiments discussed herein;

FIG. 6B illustrates a perspective view of an example seat frame, in accordance with some embodiments discussed herein;

FIG. 6C illustrates a perspective view of an example backrest frame, in accordance with some embodiments discussed herein;

FIG. 6D illustrates a perspective view of an example rear wheel subassembly, in accordance with some embodiments discussed herein; and FIG. 7 is a schematic view of an example control system for the wheelchair, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements Like reference numerals generally refer to like elements throughout. For example, reference numerals 100 and 200 are both intended to refer to wheelchair assemblies, and elements 118 and 218 are both intended to refer to driven wheels. Additionally, any connections or attachments may be direct or indirect connections or attachments unless specifically noted otherwise.

As used herein, an occupant is intended to refer to a person sitting in the wheelchair assembly, and an assistant is intended to refer to a person other than the occupant that is assisting in moving, assembling, disassembling, storing, transporting, etc. the wheelchair assembly. A user is intended to refer to either the occupant or an assistant.

FIG. 1 illustrates a perspective view of an example wheelchair assembly 100. The wheelchair assembly 100 may include various frames. For example, the wheelchair assembly 100 has a seat frame 106, a backrest frame 108, and a footrest frame 110. The backrest frame 108 may include rear handles 112 where an assistant may grasp the rear handles 112 to push the wheelchair assembly 100. Furthermore, the backrest frame 108 may include occupant armrests 114. These occupant armrests 114 may provide armrests for the occupant to rest their arms. The occupant armrests 114 may be pivotable in the wheelchair assembly 100. This may be beneficial to permit occupants to more easily exit the wheelchair assembly 100. Furthermore, the pivotable nature of occupant armrests 114 may make the backrest frame 108 more compact when stored. However, the occupant armrests 114 may not be pivotable in other embodiments. Upholstery 124 may be provided on the various frames and components of the wheelchair assembly 100 to increase the comfort level for users. The upholstery, in some embodiments, may be designed for use with sandy environments, such as beaches (e.g., the upholstery may be easily washable).

Wheelchair assemblies provided herein may include various wheels. For example, the wheelchair assembly 100 may include front wheels 116, driven wheels 118, and anti-tip wheels 120. The driven wheels 118 may require driven wheels 118 that are large in order for the wheels to effectively move in difficult terrains. In the illustrated embodiment, the driven wheels 118 possess a diameter of forty-nine (49) centimeters and a width of twenty-three (23) centimeters, but driven wheels 118 of other sizes may be used. Rotation of the driven wheels 118 may be generated by a motors 240 (see FIG. 2C) and the electrical components in the wheelchair assembly 100. Further, in the wheelchair assembly 100, the front wheels 116 and the anti-tip wheels 120 are not electrically powered, and these wheels are permitted to adjust in angular orientation and rotational speed based on adjustments at the driven wheels 118. For example, the front wheels 116 are caster wheels so that the orientation of the wheels can be easily adjusted as necessary based on the movement of the driven wheels 118. The front wheels 116 are thirty (30) centimeters in diameter and eighteen (18) centimeters in width, but other dimensions may be used for the front wheels 116 in other embodiments. Although the present disclosure describes the main rear wheels (driven wheels 118) as driven wheels, depending on the configuration, any of the wheels may be "driven" by one or more motors. In this regard, the front wheels 116 and the anti-tip wheels 120 may be electrically powered in other embodiments.

In the illustrated embodiment, separate motors 240 (see FIG. 2C) may be used to control the amount of rotation at each driven wheel 118. Thus, driven wheels 118 may be driven at different rates, and this may be beneficial to allow the wheelchair assembly 100 to easily rotate towards the left or to the right.

In the illustrated embodiment, the anti-tip wheels 120 may be elevated slightly above the ground so that the anti-tip wheels 120 will not contact the ground when the wheelchair assembly 100 is oriented in a typical upright manner. Further, the anti-tip wheels 120 may come in contact with the ground only when the wheelchair assembly 100 is rotated backward (e.g. clockwise in FIG. 1). In this way, the anti-tip wheels 120 may prevent the wheelchair assembly 100 from tipping backward. However, in other embodiments, the anti-tip wheels 120 may be configured to contact the ground even when the wheelchair assembly 100 is in a typical upright orientation. The anti-tip wheels 120 may be beneficial to prevent the motors 240 (see FIG. 2C) from coming in contact with the ground—if the wheelchair assembly 100 begins to tip backward, the anti-tip wheels 120 may come in contact with the ground before the motors 240 (see FIG. 2C).

In the wheelchair assembly 100, an input device 126 is provided at the end of an occupant armrest 114. However, the input device 126 may be provided at other locations such as at the rear handle 112, on the side of a seat frame 106, on the back of the backrest frame 108, on the motor subassembly 204 (see FIG. 2A), etc. The input device 126 may be used to provide inputs to control the operation of the wheelchair assembly 100. The input device 126 may be connected to other electrical systems in the wheelchair assembly 100 so that inputs provided at the input device 126 may be executed by the electrical systems. For example, the input device 126 may be configured to receive user commands regarding the user's desired speed or direction for the wheelchair assembly 100, and, based on the inputs received at the input device 126, the operation of the motors 240 (see FIG. 2C) may be adjusted to change the speed of the driven wheels 118 or the direction of the wheelchair assembly 100. The direction of the wheelchair assembly 100 may, for example, be changed by rotating the driven wheels 118 at different rotational speeds. The input device 126 includes a joystick 128 to receive user commands, however directional buttons and other components may be provided on the input device 126 as an additional or alternative way of inputting commands. The input device 126 may be configured to receive various commands—for example, the input device 126 may receive commands to operate in manual mode or electrically powered mode, to adjust maximum or minimum speeds, etc. The input device 126 may be part of an electronic control assembly that is configured to control motion of the wheelchair assembly 100.

The wheelchair assembly 100 is an all-terrain wheelchair assembly. The front wheels 116, the driven wheels 118, and/or the anti-tip wheels 120 may be balloon tires, and the balloon tires may be configured to more easily traverse difficult terrains such as soft sand, hard sand, stony terrains, muddy terrains, and rocky terrains. In the illustrated embodiment of FIG. 1, each of the front wheels 116, the driven wheels 118, and the anti-tip wheels 120 are balloon tires, whereas, in the illustrated embodiment of FIG. 2A, only the front wheels 116 and the driven wheels 118 are balloon tires. Notably, in the illustrated embodiment of FIG. 2A, the anti-tip wheels 220A are firm (e.g., traditional) wheels to aid in "digging" in to sand for increased traction. Where balloon tires are used, the balloon tires may be low-pressure balloon tires that are large, soft, and pliable in some embodiments, and these balloon tires may tend to float over sand compared to traditional wheels. A significant portion of the weight of the wheelchair assembly 100 may rest on the driven wheels 118, and this may be beneficial to ensure that the driven wheels 118 have traction to drive the wheelchair assembly 100. Balloon tires may greatly reduce the forces required to move the wheelchair assembly 100 across soft sand and other difficult terrains. Other traditional wheelchair assemblies often struggle to traverse soft sand and other difficult terrains and tend to get stuck in these difficult terrains. Thus, the wheelchair assembly 100 enables occupants to reach a larger number of areas as compared to more traditional wheelchair assembles.

While FIG. 1 illustrates one example wheelchair assembly, FIG. 2A-2B illustrate varying perspective views of another example wheelchair assembly 200. The wheelchair assembly 200 may include a seat subassembly 202 and a motor subassembly 204. The wheelchair assembly 200 is configured to be easily assembled and disassembled, and the seat subassembly 202 and the motor subassembly 204 may be configured to be selectively attached with each other to form the wheelchair assembly 200. Different subassemblies within the wheelchair assembly 200 may be selectively assembled and disassembled using toggle pins in the subassemblies. However, attachment of the subassemblies may be accomplished using other fasteners. Additionally, the seat subassembly 202 and the motor subassembly 204 are configured to be disassembled from each other so that they can be separately moved and carried by a single person. Once the subassemblies are disassembled, a user may easily move the seat subassembly 202 by resting the weight of the seat subassembly 202 on the front wheels 216, and the user may easily move the motor subassembly 204 by resting the weight of the motor subassembly 204 on the driven wheels 218. With the weight of the relevant subassembly on its wheels, the subassembly may be easily shifted and a reciprocal rotation of the wheels may be caused. Where the user is attempting to move the motor subassembly 204, the user may be required to disengage a gearbox 442 (see FIG. 4B) in order to permit the driven wheels 218 to be freely rotated. Disassembly of the seat subassembly 202 and the motor subassembly 204 may permit these subassemblies to be fit into smaller volumes. For example, the two subassemblies may be stored together in a volume of less than 70 cubic feet, less than 50 cubic feet, less than 40 cubic feet, less than 30 cubic feet, or preferably less than 20 cubic feet. Thus, the subassemblies may be configured to fit in the trunk or boot of a vehicle such as an SUV.

The seat subassembly 202 may include the seat frame 206, the backrest frame 208, and the footrest frame 210, and upholstery 224 (which may be provided on each of these frames to increase the comfort level for users). The backrest frame 208 may include rear handles 212 where an assistant may grasp the rear handles 212 to push the wheelchair assembly 200. Furthermore, the backrest frame 208 may include occupant armrests 214. These occupant armrests 214 may provide armrests for the occupant to rest his or her arms. The occupant armrests 214 are pivotable in the wheelchair assembly 200. This may be beneficial to permit occupants to more easily exit the wheelchair assembly 200. Furthermore, the pivotable nature of the occupant armrests 214 may make the backrest frame 208 more compact when stored. However, the occupant armrests may not be pivotable in other embodiments.

Furthermore, wheelchair assemblies may include various wheels. For example, the wheelchair assembly 200 may include front wheels 216, driven wheels 218, and anti-tip wheels 220A. As noted above, the illustrated anti-tip wheels 220A may not be balloon tires (and, instead, be traditional wheels). The driven wheels 218 may require balloon tires that are large in order for the wheels to effectively move in difficult terrains. The driven wheels 218 may possess a diameter of forty-nine (49) centimeters and a width of twenty-three (23) centimeters, but other sized driven wheels 218 may also be used. Rotation of the driven wheels 218 may be generated by motors 240 (see FIG. 2C) and the electrical components in the wheelchair assembly 200. Further, the front wheels 216 and the anti-tip wheels 220A are not electrically powered and are permitted to adjust angular orientation and rotation speed based on adjustments at the driven wheels 218. For example, the front wheels 216 are caster wheels so that the orientation of the wheels can be easily adjusted as necessary based on the movement of the driven wheels 218. However, the front wheels 216 and the anti-tip wheels 220A may be electrically powered in other embodiments.

The wheelchair assembly may be an all-terrain wheelchair assembly. Thus, the wheelchair assembly may be configured to be used in more difficult environments such as beaches, which may have soft sand, dunes, and rocky terrain that is difficult to traverse. The front wheels 216 and the driven wheels 218 may each be balloon tires that are configured to more easily traverse difficult terrains such as soft sand, hard sand, stony terrains, muddy terrains, and rocky terrains. Further, the all-terrain nature of the wheelchair assembly 200 may require power where the wheelchair assembly 200 is electrically powered. Notably, relative to non-all-terrain wheelchairs, traversing over sand may require more power than other surfaces in urban environments such as pavement or hard floors. Where more power is needed, the electrically powered wheelchair assembly 200 may require larger motors and higher battery capacity. Thus, the motor 240 and the battery 730' (see FIG. 7) may be some of the heavier components in the wheelchair assembly 200.

A battery box 230 may be provided in the seat subassembly 202. More particularly, the battery box 230 is installed at the seat frame 206 underneath the location where the occupant sits. A battery 730' (see FIG. 7) may be provided within the battery box 230, and the battery 730' may have a weight of approximately fifteen (15) kilograms (although other weights are contemplated, such as less than 16 kilograms, less than 15.5 kilograms, less than 15 kilograms, etc.). Placement of the battery box 230 at the seat subassembly 202 may also tend to improve the weight distribution of the wheelchair assembly 200 as a whole by separating the heavier battery box 230 and the heavier components associated with the motor(s) 240 from each other (see e.g., FIG. 2C). Furthermore, the weight of the battery 730' may be reduced by using lithium style batteries rather than traditional lead acid batteries. Notably, any type of battery may be used with various example embodiments described herein.

In some embodiments, the wheelchair assembly 200 may define a front-to-back direction, and the wheelchair assembly 200 may define a center of gravity. The motor subassembly 204 and the battery box 230 may each define a center of gravity. The center of gravity for the motor subassembly 204 may be provided rearwardly of the center of gravity for the wheelchair assembly 200 along the front-to-back direction. Further, the center of gravity for the battery 230 may be provided in front of the center of gravity for the wheelchair assembly 200 along the front-to-back direction. In some embodiments, the battery and the motors are separated by a horizontal distance of at least two hundred five (205) millimeters when the wheelchair assembly 200 is fully assembled and oriented in an upright position, and this may improve the weight distribution of the wheelchair assembly 200. Improved weight distribution may be particularly important when the wheelchair assembly 200 is operating on an incline, as the incline may alter the typical orientation of the wheelchair assembly 200.

Additionally, by placing the battery box 230 at the seat subassembly 202 rather than the motor subassembly 204, the weight of the motor subassembly 204 may be reduced. In some embodiments, the weight of the seat subassembly 202 may be less than thirty-five (35) kilograms, and the weight of the motor subassembly 204 may be less than twenty-nine (29) kilograms. As a result, the wheelchair assembly 200 may be disassembled so that the seat subassembly 202 and the motor subassembly 204 are separated from each other, and each subassembly may be moved, carried or lifted individually by a single person. However, where a single person is uncomfortable carrying or lifting the subassemblies, a single person may still easily move the subassemblies to a storage location (e.g. a vehicle trunk or boot) and then the subassemblies may be easily carried or lifted into the storage location by two people. Notably, in some embodiments, the seat subassembly 202 and/or the motor subassembly 204 may be further broken down into easily attachable or mountable parts that further reduce weight of carriable parts. For example, the seat subassembly 202 may be broken down into a battery subassembly (that may be positionable within the battery box 230), one or more front wheel assemblies (that each may be attachable to seat frame), a battery box subassembly, a backrest subassembly (that may include the backrest frame 208), and/or other subassemblies. As another example, the motor subassembly 204 may be broken down into a motor platform subassembly, one or more anti-tip wheel subassemblies, one or more driven wheel assemblies, and/or other subassemblies. Further, the weight and volume of the motor subassembly may be significantly reduced by removing the driven wheels from the motor subassembly. Each subassembly may be easily carriable and attachable to each other to form the wheelchair assembly. In some embodiments, each subassembly may be less than thirty-five (35) kilograms.

Looking now at FIG. 2B, a connection arm 221 is illustrated. This connection arm 221 may help facilitate the connection between the motor subassembly 204 and the seat subassembly 202. When the user wishes to operate the wheelchair assembly 200 without the motor subassembly 204 attached, the user may remove the motor subassembly 204 and the connection arm 221. A rear axle 621A (see FIG. 6D) may be installed in place of the connection arm 221, and rear wheels 618' (see FIG. 6D) similar to the driven wheels 218 may be connected at both ends of the rear axle 621A.

FIG. 2C illustrates an enhanced perspective view of the example motor subassembly 204 where components within the motor subassembly 204 may be more easily seen. One or more motors 240 may be provided in order to generate rotation of the driven wheel hubs 218A and the driven wheels 218 that are attached to these driven wheel hubs 218A. In the illustrated embodiment, two motors 240 are provided, and each motor 240 is provided adjacent to a respective driven wheel 218 and is configured to generate rotation of the respective driven wheel 218. Additional motors may be provided in other embodiments, and motors may be used at other locations. For example, in some embodiments, motors may be used to generate rotation of the front wheels or the anti-tip wheels, and the motors may be positioned adjacent to these wheels. Axles 222 may extend from a gearbox 442 (see FIG. 4B) and may engage with the driven wheels 218.

The motor subassembly 204 may include a motor platform 236. The motor platform 236 may provide a location where a top portion 238A of a motor controller box and a bottom portion 238B of a motor controller box may be attached. A motor controller may be provided in the motor controller box to control the operation of the motors 240. Electrical wiring may extend from the motor controller to the battery box 230 (see FIG. 3A), to the input device 126 (see FIG. 1), and to other electrical components. Motors 240 may be installed on the underside of the motor platform 236. Positioning the motors 240 at this location may help prevent water or other materials projected from the front wheels 216 from coming into contact with the motors 240, and the motors 240 may be provided proximate to the driven wheels 218 so provide a smaller footprint for the motor subassembly 204.

The motor platform 236 may include arms 232 extending upwardly to connect with the backrest frame 208. The arms 232 may be connected to mounting lugs 236A provided on the motor platform 236. The arms 232 may be pivotable about an axis defined at the mounting lugs 236A (see FIG. 4C) so that the overall volume of the motor subassembly 204 may be reduced when the motor subassembly 204 is disassembled from the seat subassembly 202 (see FIG. 2A). Furthermore, the motor platform 236 may be connected to the connection arm 221 using one or more fasteners.

Additionally, anti-tip wheels 220A may be provided in the motor subassembly 204. Arms 234 may extend rearwardly from the motor platform 236, and the anti-tip wheels 220A may be connected to the arms 234.

FIGS. 3A-3C illustrate varying perspective views of an example seat subassembly 202. The seat subassembly 202 may include the seat frame 206, the backrest frame 208, and the footrest frame 210. The seat subassembly 202 may connect to a connection arm 221 (see FIG. 2C) that is provided in the motor subassembly 204 (see FIG. 2C). The connection arm 221 may help facilitate a connection between the seat subassembly 202 and the motor subassembly 204 (see FIG. 2C). Where a user wishes to operate the wheelchair assembly 200 without the motor subassembly 204 attached, the user may remove the motor subassembly 204 and connect a rear axle 621A (see FIG. 6D) in place of the connection arm 221, and rear wheels 618' (see FIG. 6D) similar to the driven wheels 218 may be installed at both ends of the rear axle 621A using fasteners. A user may wish to operate the wheelchair assembly 200 proximate to water—where this is the case, the user may remove the motor subassembly 204 and other electronic components such as the input device 126 (see FIG. 1) and the battery box 230 to avoid exposure of these electrical components to the water. However, electrical components may be protected with waterproof seals in some embodiments.

The connection arm 221 may possess features that help to position the seat subassembly 202 correctly relative to the motor subassembly 204 (see FIG. 2C). For example, protrusions 421B (see FIG. 4B) may extend upwardly from the connection arm 221 that guide the seat subassembly 202 to a correct position relative to the motor subassembly 204. Furthermore, holes may be provided in the connection arm 221, in the seat subassembly 202, and at the motor subassembly 204 to help facilitate the connection between the two subassemblies.

While FIGS. 3A-3C illustrate a seat subassembly 202, FIGS. 4A-4B illustrate varying perspective views of an example motor subassembly 204 that may be attached to the seat subassembly 202. As illustrated, the motor subassembly 204 may include motors 240 and gearboxes 442 associated with motors 240. A rear axle 222 may extend into each respective gearbox 442, and the rear axle 222 may be received in a driven hub 218A. Thus, the motor 240 may operate in conjunction with the gearbox 442 to generate rotation of a rear axle 222, and the rotation of the rear axle 222 may cause rotation of the attached driven hub 218A and the attached driven wheel 218.

Further details regarding certain components of the example motor subassembly 204 may be seen in FIGS. 4C-4D. As illustrated in FIGS. 4C-4D, a motor controller box may be formed by a top portion 238A and bottom portion 438B. The top portion 238A and the bottom portion 438A may be effectively sealed against the motor platform 236 to make the controller box 238 waterproof and dust-proof. This may be beneficial to protect certain electrical components and other components that may be sensitive to water, moisture, dust, or contamination.

Further details regarding the operation of the motor subassembly 204 may be seen in FIGS. 4E-4F. FIG. 4E illustrates an enhanced perspective view of an example driven wheel hub 218A, and FIG. 4F illustrates an enhanced perspective view of an example motor 240 and gear box 442. The driven wheel hub 218A may be attached to the rear axle 222 so that the rear axle 222 and the driven wheel hub 218A rotate together. In some embodiments, rather than having a single rear axle 222 extending through both driven wheel hubs 218A, two separate rear axles 222 are provided, with a rear axle 222 being used with a respective driven wheel hub 218A. By providing separate rear axles 222, the driven wheels 218 (see FIG. 4B) and the driven wheel hubs 218A may be rotated at different rotational speeds so that the wheelchair assembly may be permitted to rotate.

To install the motor subassembly 204 (see FIG. 4A) to the seat subassembly 202 (see FIG. 3A), any rear manual wheel subassembly 650 (see FIG. 6D) attached to the seat subassembly 202 may be removed. This may be done by removing any fasteners that are connecting the two subassemblies. With the rear manual wheel subassembly 650 being removed, the motor subassembly 204 may be provided in place of the rear manual wheel subassembly 650. A user may position the seat subassembly 202 on the motor subassembly 204, with the seat subassembly 202 resting on the connection bar 221 as illustrated in FIG. 2C. The protrusions 421B (see FIG. 4B) on the connection bar 221 may assist the user in positioning the seat subassembly 202 to expedite the assembly. Fasteners such as toggle pins may be used to secure the seat subassembly 202 to the connection bar 221 and/or other components of the motor subassembly 204. Additionally, the arms 232 (see FIG. 4A) may also be rotated appropriately and attached to the seat subassembly 202. To the extent a motor controller 738 (see FIG. 7) is not already provided on the motor subassembly 204, the motor controller 738 may be attached to the motor subassembly 204. Furthermore, wiring may be extended from the motor controller 738 to other components on the seat subassembly 202 such as the battery box 230 (see FIG. 3A) and the input device 126 (see FIG. 1). Wiring may also be extended from the motor controller 738 to the motors 240 (see FIG. 4A).

FIG. 5A illustrates a perspective view of an example battery box 230 disposed on the seat subassembly 202. FIG. 5B illustrates a perspective view of an example bottom portion 230A of the battery box 230 of FIG. 5A. FIG. 5C illustrates a perspective view of an example top portion 230B of the battery box 230 of FIG. 5A. As illustrated, the battery box 230 may be disposed on the seat frame 206 (see FIG. 2A) of the seat subassembly 202. The battery box 230 may be disposed directly underneath the seat 502A where an occupant will be positioned. The battery box 230 may be provided in front of the center of gravity for the wheelchair assembly 200 (see FIG. 2A), and this may be beneficial to evenly distribute the weight of the wheelchair assembly as the battery box 230 may counteract a moment generated by the motor subassembly. As illustrated in FIG. 5B, the bottom portion 230A of the battery box 230 may define an internal cavity. Furthermore, as illustrated in FIG. 5C, the top portion 230B of the battery box 230 may also define an internal cavity. When the bottom portion 230A and the top portion 230B are attached together, the two internal cavities of the two portions may define an internal volume where a battery 730' (see FIG. 7) may be stored. The bottom portion 230A and the top portion 230B may be attached together and sealed so that water, moisture, dust, and other contaminants are prevented from affecting the internal contents of the battery box 230 (e.g., the battery).

The seat subassembly 202 (see FIG. 2A) may include several different frames, and FIGS. 6A-6C illustrate various perspective view of these frames in isolation. FIG. 6A illustrates a perspective view of an example footrest frame 210, FIG. 6B illustrates a perspective view of an example seat frame 206, and FIG. 6C illustrates a perspective view of an example backrest frame 208. The occupant armrest 214 may be pivotably attached to the remainder of the backrest frame 208. Stops 208A may be provided on the backrest frame 208 to prevent rotation of an occupant armrest 214 past a deployed position. Frames may comprise lightweight material such as stainless steel or another lightweight metal. However, other materials may also be used in the frames.

Where a user desires to operate the wheelchair assembly without any motor subassembly attached, a rear wheel subassembly may be attached in place of the motor subassembly. FIG. 6D illustrates a perspective view of an example rear manual wheel subassembly 650. The rear manual wheel subassembly 650 may include a rear axle 621A, and rear wheels 618' may be attached at each end of the rear axle 621A. To attach the rear manual wheel subassembly 650, the rear axle 621A may be installed at the same position as the connection arm 221 relative to the seat subassembly 202. In some embodiments, the rear manual wheel subassembly 650 may be disassembled by removing fasteners in the form of toggle pins so that the rear wheels 618' can be removed from the rear axle 621A.

FIG. 7 illustrates a rear view of an example control system 700 with a controller 738 and other electrical components that may be connected to the controller 738 to form an electrical control assembly. The controller 738 may be deployed in a motor controller box having a top portion 238A (see FIG. 4C) and a bottom portion 438B (see FIG. 4C). The controller 738 may include a first bus 746A and a second bus 746B. A first input device 726A may be connected to the first bus 746A, and a second input device 726B may be connected to the second bus 746B. A first motor 740A and a second motor 740B may also be connected to the controller 738, and a first park brake 744A and a second park brake 744B may also be connected to the controller 738. One or more batteries 730' and an on-board charger 748 may also be provided that are connected to the controller 738. In some embodiments, in the event of power being lost at the controller, the park brakes 740A, 740B may be automatically activated. This may be beneficial to prevent accidents if power is lost while the wheelchair assembly 100 (see FIG. 1) is operating on an incline. In some embodiments, one or more levers (such as on the motor directly) may be manipulated to cause the motors to disengage and enable manual operation of the wheelchair. Additionally or alternatively, in some embodiments, commands may be received from a user at the first input device 726A or the second input device 726B to operate in electrical mode or a manual mode. Operating in an electrical mode may result in the park brakes 740A, 740B being active to prevent movement of the wheelchair assembly 100 when no movement commands are received from the input devices 726A, 726B, and this may be beneficial for safety reasons. A user may switch to a manual mode to prevent the park brakes 740A, 740B from being applied, and a user may then move the wheelchair assembly 100 manually.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A wheelchair assembly for easy assembly and disassembly, the wheelchair assembly comprising:

a plurality of frames configured to be selectively attached or disassembled with each other to form the wheelchair assembly;

at least one motor;

a battery; and a plurality of wheels, wherein the wheelchair assembly is an all-terrain wheelchair assembly and defines a front-to-back direction and a center of gravity, the battery defining a battery center of gravity located in front of the wheelchair assembly center of gravity along the front-to-back direction, and a motor subassembly defining a motor subassembly center of gravity located rearwardly of the wheelchair assembly center of gravity along the front-to-back direction.

2. The wheelchair assembly of claim 1, wherein the wheelchair assembly includes a plurality of subassemblies, wherein each of the plurality of subassemblies weighs less than thirty-five (35) kilograms.

3. The wheelchair assembly of claim 2, wherein the plurality of subassemblies includes a first subassembly and a second subassembly, wherein the plurality of frames includes a first frame and a second frame, wherein the first subassembly includes the first frame and the battery, wherein the second subassembly includes the second frame and the at least one motor, wherein the first subassembly is configured to be selectively attached to the second subassembly.

4. The wheelchair assembly of claim 3, wherein the battery is provided in a different subassembly than the at least one motor to more evenly distribute the weight of the wheelchair assembly and so that the weight of the first subassembly and the second subassembly are both less than thirty-five (35) kilograms.

5. The wheelchair assembly of claim 1, wherein the battery and the at least one motor are separated by a horizontal distance of at least two hundred five (205) millimeters when the wheelchair assembly is fully assembled and oriented in an upright position so as to form a center of gravity therebetween.

6. The wheelchair assembly of claim 1, further comprising:

an additional set of one or more wheels that are provided at the rear of the wheelchair assembly, wherein the additional set of one or more wheels are configured to prevent the wheelchair assembly from toppling backward.

7. The wheelchair assembly of claim 6, wherein the additional set of one or more wheels are configured to prevent the at least one motor from contacting the ground when the at least one motor is assembled.

8. The wheelchair assembly of claim 1, further comprising an electronic control assembly that is configured to control motion of the wheelchair assembly.

9. The wheelchair assembly of claim 8, wherein the electronic control assembly is configured to receive user commands, wherein the electronic control assembly is configured to adjust the direction or speed of the wheelchair assembly.

10. The wheelchair assembly of claim 9, further comprising an occupant armrest, wherein the electronic control assembly includes a joystick configured to receive user commands, wherein the joystick is positioned proximate to the occupant armrest so that the joystick is configured to be operated by an occupant.

11. The wheelchair assembly of claim 8, wherein the electronic control assembly includes a park brake, the park brake being configured to automatically activate upon loss of power to the electronic control assembly.

12. The wheelchair assembly of claim 1, wherein the wheels are low-pressure balloon tires.

13. The wheelchair assembly of claim 1, further comprising a rear manual wheel subassembly including a rear axle and a pair of rear wheels attached at opposite ends of the rear axle, the rear manual wheel subassembly being configured to be selectively attached to the wheelchair assembly in place of a motor subassembly to permit manual operation of the wheelchair assembly.

14. A wheelchair assembly for easy assembly, disassembly, and transport, the wheelchair assembly comprising:

a seat subassembly having a first frame, the seat subassembly being configured to be manually operated when the motor subassembly is not attached to the seat subassembly;

a motor subassembly having a second frame and at least one motor, the motor subassembly being configured to be selectively attached to the seat subassembly to make the wheelchair assembly electrically-powered;

a battery subassembly including a battery, the battery and the at least one motor being separated by a horizontal distance of at least two hundred five (205) millimeters when the wheelchair assembly is fully assembled and oriented in an upright position so as to form a center of gravity therebetween; and a plurality of wheels, the wheelchair assembly being an all-terrain wheelchair assembly, the seat subassembly, motor subassembly, and battery subassembly each being configured to be selectively attached to one another to form the wheelchair assembly and disassembled from one another so that each subassembly is separately carriable by a single person.

15. The wheelchair assembly of claim 14, wherein each of the seat subassembly, the motor subassembly, and the battery subassembly weighs less than thirty-five (35) kilograms.

16. The wheelchair assembly of claim 14, wherein the seat subassembly, the motor subassembly, and the battery subassembly are configured to be disassembled from each other so that each of the subassemblies is capable of being stored together in a volume of fifty (50) cubic feet.

17. A motor subassembly for use in a wheelchair assembly, the motor subassembly comprising:

a motor platform configured to be selectively attached to a remaining portion of a wheelchair assembly to form the wheelchair assembly;

a motor controller mounted to the motor platform;

at least one motor mounted to the motor platform, a pair of driven hubs configured to be attached at opposite sides of the motor platform; and a pair of driven wheels, each configured to be attached to a respective driven hub of the pair of driven hubs, the motor subassembly having a combined weight of the motor subassembly is less than twenty-nine (29) kilograms, wherein the motor platform is configured to be selectively attached to a remaining portion of a wheelchair assembly to form the wheelchair assembly.

18. The motor subassembly of claim 17, wherein the at least one motor includes a pair of motors, wherein the pair of motors are each configured to generate rotation of a respective driven hub of the pair of driven hubs.

19. The motor subassembly of claim 17, further comprising:

an additional set of one or more wheels that are provided at the rear of the motor subassembly, wherein the additional set of one or more wheels are configured to prevent the wheelchair assembly from toppling backward.

20. The motor subassembly of claim 17, wherein the motor controller is housed in a motor controller box, the motor controller box being sealed against the motor platform.

* * * * *